United States Patent [19]

Shoup et al.

[11] Patent Number: 4,831,558
[45] Date of Patent: May 16, 1989

[54] DIGITALLY BASED SYSTEM FOR MONITORING PHYSICAL PHENOMENA

[75] Inventors: Dale W. Shoup, Edmonds; James E. Ernest, Seattle, both of Wash.

[73] Assignee: The Slope Indicator Company, Seattle, Wash.

[21] Appl. No.: 900,543

[22] Filed: Aug. 26, 1986

[51] Int. Cl.$^4$ .............................................. G06F 15/74
[52] U.S. Cl. ................................ 364/550; 340/825.06; 340/825.07; 340/825.08
[58] Field of Search ............... 340/825.06, 825.07, 340/825.08; 364/550

[56] References Cited

U.S. PATENT DOCUMENTS

| | | | |
|---|---|---|---|
| Re. 30,037 | 7/1979 | Bass ................................... | 364/900 X |
| T 104,003 | 3/1984 | Hall et al. ................... | 340/825.08 X |
| 3,921,152 | 11/1975 | Hagar et al. ............... | 340/825.07 X |
| 4,234,926 | 11/1980 | Wallace et al. ................. | 364/900 X |
| 4,388,690 | 6/1983 | Lumsden ......................... | 364/900 X |
| 4,452,087 | 6/1984 | D'Antonio ............................ | 73/786 |
| 4,581,604 | 4/1986 | Kimura et al. ............. | 340/825.06 X |
| 4,733,224 | 3/1988 | Kimura ....................... | 340/825.07 X |
| 4,736,367 | 4/1988 | Wroblewski et al. ..... | 340/825.08 X |

OTHER PUBLICATIONS

DGH Pamphlet entitled "D1000 Series Sensor to Computer Interface Modules".
DGH Pamphlet entitled "D2000 Series Customer Programmable Interface Modules".
DGH Pamphlet entitled "D1000 Series Sensor to Computer Interface Modules".
Transensory Devices, Inc. Pamphlet entitled "Sensorbus. Give Your Computer Some Sense. . . ".

Primary Examiner—Parshotam S. Lall
Assistant Examiner—Edward R. Cosimano
Attorney, Agent, or Firm—Garrison & Stratton

[57] ABSTRACT

A system and apparatus for monitoring physical phenomena and changes in structures which includes a plurality of programmable intelligent transducers arranged in an array, each of which is uniquely addressable by a remote controller to perform its intended measurement functions, translate the analog measurement obtained into digital signals and transmit same to the controller. The monitoring is selective to each individual intelligent transducer. The intelligent transducers combine measurement functions, microprocessor functions and communication functions all programmed and activated from this central controller.

25 Claims, 16 Drawing Sheets

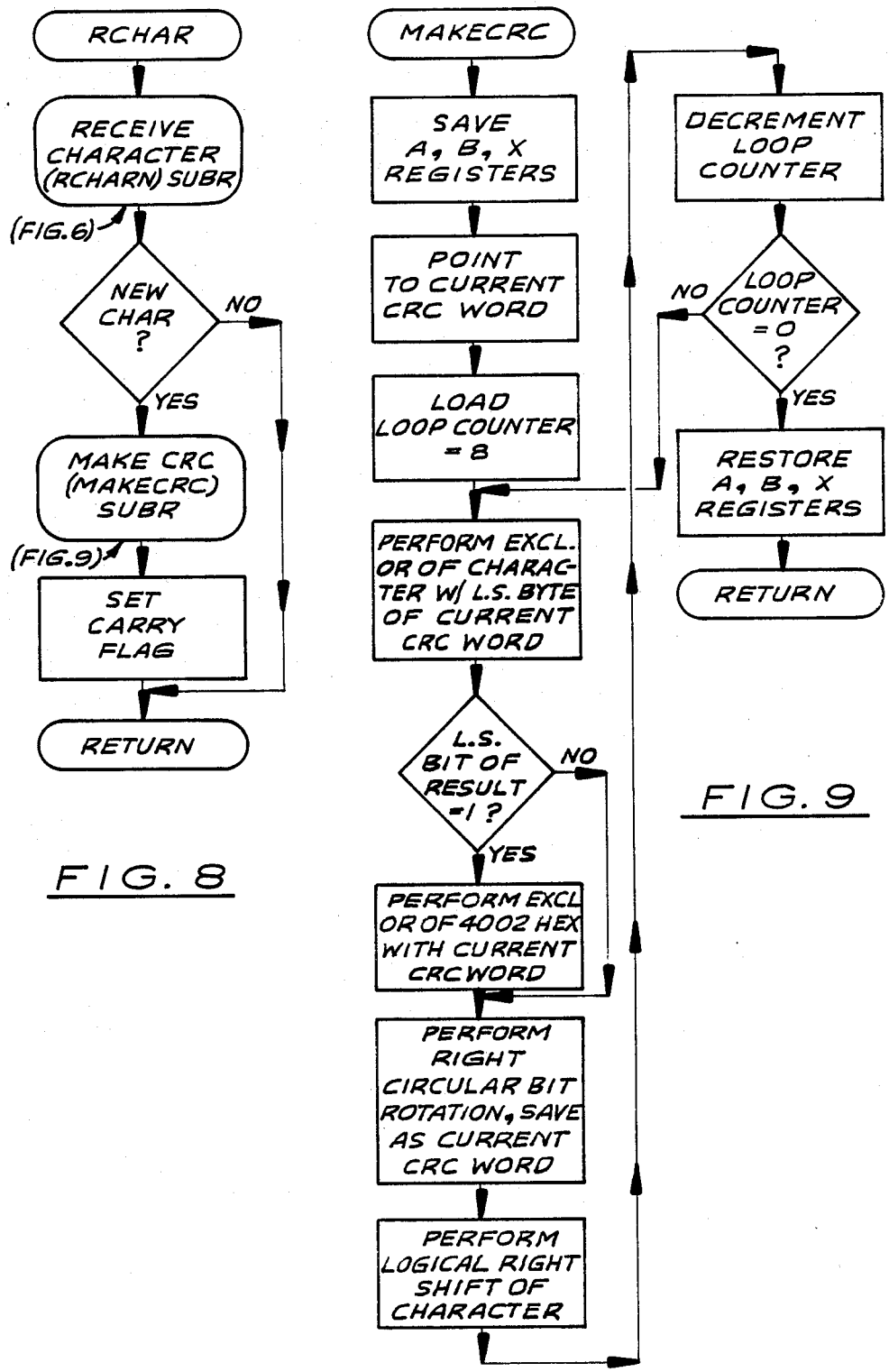

DIGITALLY BASED SYSTEM FOR MONITORING PHYSICAL PHENOMENA

TECHNICAL FIELD

This invention relates generally to systems for monitoring physical phenomena and changes in structures, more particularly to a system for monitoring physical phenomena and changes in structures by attaching a plurality of transducers to the structure and polling the transducers periodically for information concerning the physical phenomena and changes measured by the transducers.

BACKGROUND ART

Systems for detecting physical movement in and forces on structures are known in the prior art to include generally, a plurality of transducers, a data collection network and a means to interpret, store and display the collected data.

Structures can include towers, vehicles, buildings, dams, railroad beds, airport runways, mining embankments, machinery and the like. Forces imposed upon the structures, temperatures and changes in dimensions of a structure are important for maintenance and for safety reasons.

There are many kinds of transducers which transform a physical measurement into an electrical response such as a force produced by an acceleration (accelerometer), dimensional change (strain gage), inclinational change (inclinometer), pH readings or a thermal change (thermometer). The electrical response from a transducer may be in the form of an analog electrical signal. Common analog electrical signals convey information proportional to a voltage, current, frequency, phase change, etc. A plurality of tranducers are mounted at selected locations of a structure. The usual practice is to mount the transducer at or close to the sites of the structure deemed to be most critical or to be most sensitive to changes, such as on the thinnest portion of a structural member to measure deformations, at the extremities of objects subject to rotation to measure acceleration and the like.

The usual practice is to conduct the analog electrical outputs or signals from each transducer to a centrally located means to interpret, store and display the data. The means to interpret, store and display is usually a data logger with a visual display and printer; although it has also been the practice to amplify the electrical outputs and to display the data on calibrated analog dials and/or charts, either individually or on a centrally located console. Another practice is to tie a computer with a video display and printer to a decentralized scanner network to interrogate the desired electrical output. In order to simplify the discussion, the word computer will be used to refer to the centrally located means to interrogate, interpret, store and display the data; although the means to interrogate, interpret, store and display the data can be any other type of equipment as mentioned above and may not need to be completely centralized.

Because the electrical outputs from the transducers must be transmitted over substantial distances, a high quality, shielded cable is desirable in order to minimize data loss, electrical distortions, and electromagnetic interference and noise. Even so, the distance over which such electrical signals may be transmitted is limited by conductor resistance and transmission losses.

Because the present practice in many instances requires the analog outputs from each transducer to be individually wired to the computer or scanner unit, installing the data collection network can be expensive and time consuming. Often the cost of the data collection network is an appreciable cost in the monitoring system and usually the most susceptible to damage and changes. In an attempt to decrease cabling costs, multiplex systems have been used where the configuration of the network permits. To incorporate a multiplex, several transducers' outputs are inputted into a circuit which converts the analog data into a digital format and then time division multiplexes the various digital data along a common line to the computer, the computer program then separates and interprets the digital data according to the time the data is received. While multiplexing can be used on some systems, multiplexing cannot be used advantageously in all systems, particularly where the configurations of the transducers are so spaced that no net savings in cabling costs is obtained by multiplexing. In addition, because the number of data lines which can be multiplexed is limited by the capacity of the multiplex system used, it has been sought to develop a simplified data collection system having low cabling cost that conveys the information accurately to the computer and is expandable according to the user's needs. The system should be independent of the particular transducer used (i.e., strain gauge, accelerometer, inclinometer, thermometer, etc.). This means that the type of data transmitted by the network should also be uniform in nature and compatible with the computer to use advantageously the capacity of a readily available computer to interpret and reconstruct the information generated at each transducer.

Microelectronics in the form of integrated circuits substrated upon a chip have been recently undergoing significant technological developments. As increasing numbers of digitally based circuit elements are fabricated onto a silicon chip, the cost of a basic circuit function has decreased markedly as has the physical size of the electronics. The power required to operate these circuits on a chip has decreased to the point where the power required to run the electronics may in some instances be obtained from the energy contained in the digital input signals themselves; furthermore, the speed and reliability of these circuits have likewise increased. Unlike analog data, signals transmitted digitally are not degraded as long as each bit is correctly received. The noise or cross talk which would be objectionable in an analog signal have no degrading effect on digital signals, as long as the noise or cross talk is substantially weaker than the digital signals so that the presence of each binary bit can be distinguished and fully regenerated.

Should there be a chance of noise or cross talk near the same level, it has been the practice to use redundant error detection bits such as check sum or cyclic redundancy code (CRC) to verify correctness to digital transmission with a higher degree of certainty.

A system using sensor to computer interface modules is also known in which the analog output from sensors of various types is gathered and converted into digital form and transmitted upon request to a computer in ASCII format. This system does not provide for integration of microprocessor with the sensors.

OBJECTS OF THE INVENTION

Accordingly, it is a general object of the present invention to provide an improved system for monitoring physical changes in structures. More specifically, it is an object of the present invention to provide an intelligent transducer network with semiconductor microcomputer chips.

It is also an object of the invention to provide each intelligent transducer location with a unique address code and instructions to perform a measuring function and data transmit function when commanded to do so with its unique address code.

It is another object of the invention to provide intelligent transducer modules for use in the monitoring system which modules perform the measurement function and translate the analog signal into a digital signal for transmission to a central controller.

It is another object of the present invention to obtain the foregoing objects and also to provide an improved data collection network that utilizes a single data collection pair of conductors to communicate to the plurality of the transducer locations and the computer.

It is further an object of this invention to simplify the data collection system by programming each intelligent transducer to convert the electrical responses into a digitally formatted numerical equivalence of the physical measurement made by the transducer.

Another object of the present invention is to insure reliability of the transmitted data by instructing the computer and each intelligent transducer to generate and transmit together with the digital data, a redundant error code corresponding to the digital data, and to instruct the receiving device to determine whether the redundant error code conforms to the digital data and if not, to reject the digital data.

These and other objects of the present invention, which will become apparent from the following specifications, are accomplished by means hereinafter described, the invention being measured by the appended claims and not by the details of the specifications.

SUMMARY OF THE INVENTION

The present system combines a microelectronic computer circuit integrated onto a chip or semiconductor chip product with a sensor in a unit known as an intelligent transducer. Each chip, together with any necessary signal conditioners converts the analog or frequency information from the sensor into digital form in situ and stores the information for transmission. Each chip has a unique address code stored in an electrically erasable, programmable, read-only-memory (EEPROM) whereby, when polled with its unique address code and so instructed, the chip will perform an evaluation and then serially transmit the digital data information corresponding to the transducer's output. All the intelligent transducer outputs are connected together by a system bus through an interface adapter to a computer means or central data processing unit. The computing means generates polling commands with unique address codes according to a program. When a particular intelligent transducer is first polled, and commanded to do so, the intelligent transducer converts the analog information generated by its sensor to a digital form and transmits the digital information serially onto the system bus which is transmitted back to the computer means. The computer means processes the information to provide for records, to compare the information with preset amounts, to provide for alarm status, etc. To reduce transmission error, the computer and intelligent transducers are provided with a program to transmit along with the commands or data a redundant error code such as a cyclic redundancy check (CRC). When the computer or intelligent transducers receive the digital information and CRC from a polled intelligent transducer or the computer respectively, it independently computes what the CRC should have been, and compares it with what was received. If there is a difference, the computer rejects the digital information and again requests transmission, while the intelligent transducer ignores the command and awaits a second request.

In the preferred embodiment, the intelligent transducers and associated electronics are powered by a separate 5-volt line although, where possible, the intelligent transducers and associated electronics can also be powered along the data transmission lines.

The computer can be any general purpose computer which has a serial RS-232C transmission port. On this type of system, the operator or program being executed asks for specific readings at specific times unless it is programmed for a real time operation to interrupt, according to a programmed clock or an alarm conditioned interrupt condition, other concurrent tasks. An interface adapter is provided to convert the signals to and from the intelligent transducers into signals recognizable by the RS-232C port.

While the preferred embodiment describes a particular transducer as a vibratory-wire strain guage which, when stimulated, responds with a frequency which can be mathematically related to physical deformation, other types of transducers are usable as well. Accelerometers, inclinometers, thermometers, fluid or gas pressure and composition measuring devices, etc., may also be used as transducers in this system. By properly interfacing the particular transducer with the electronics necessary for signal conditioning, the data collection network means become independent of the physical property being measured, or the type of transducer employed. The computer can be programmed to relate the data to the physical property being measured.

An interface module operating in half duplex mode is interposed between the intelligent transducers and the RS-232C port of the controller to translate the RS-232C signals to be compatable with the signals received and transmitted by the intelligent transducers.

For systems incorporating a large number of intelligent transducers (the possible number being virtually unlimited) a bus repeater to augment weakened signals may be required.

While it is usually necessary to program the intelligent transducers only once, during the manufacture and installation of the system, the intelligent transducers may readily be reprogrammed to modify or augment the functions performable by any intelligent transducer.

BRIEF DESCRIPTION OF THE DRAWINGS

FIG. 8 is a simplified block diagram of the Receive Character with CRC (RCHAR) subroutine.

FIG. 9 is a simplified block diagram of the Make CRC (MAKECRC) subroutine.

BEST MODE OF CARRYING OUT THE INVENTION

Figure 1:
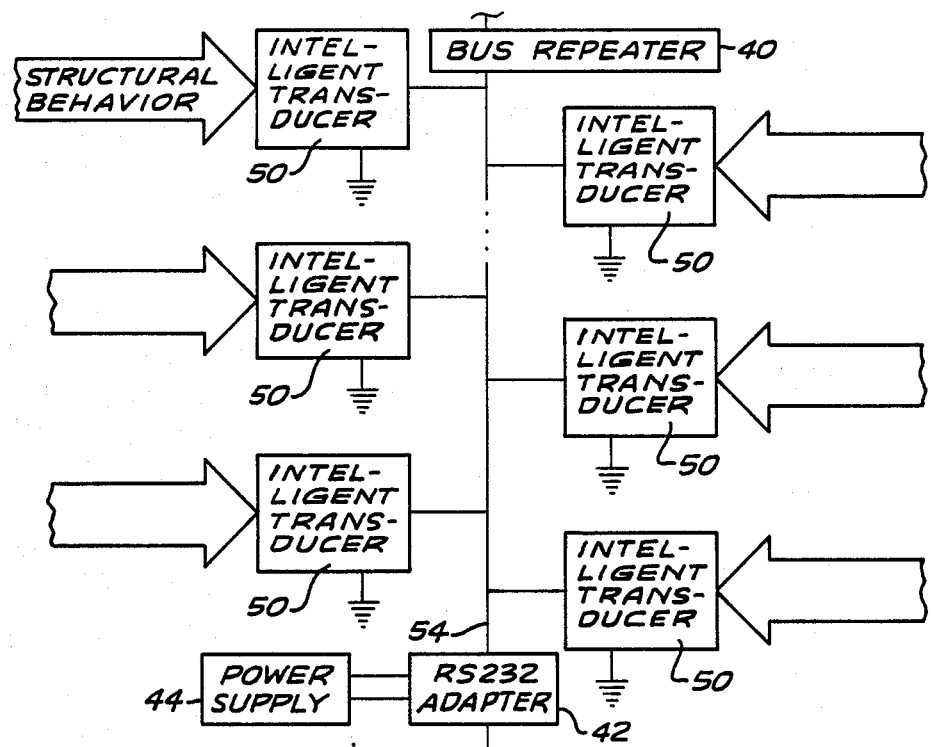
FIG. 1 is a simplified block diagram of the functional elements of a monitoring system according to the preferred embodiment of this invention.

1.0 General Description of System, FIG. 1

Referring to the system's diagram, FIG. 1, as will be explained in detail, the system incorporates one or a plurality of intelligent transducers 50, each intelligent transducer 50 responding to a physical measurement or a structural behavior at the site selected, each intelligent transducer 50 uniquely identifiable by the central controller 52. By describing only one intelligent transducer 50 in detail, it is to be understood that the other intelligent transducers 50 are also described since, except for the details unique to an individual intelligent transducer, they incorporate the same features described in this preferred embodiment.

Each intelligent transducer 50 communicates electronically to the central controller 52 along a common data transfer conducting means or system bus 54 through the RS-232 adaptor and cable. Bus repeater 40 augments weakened signals from distant plurality of intelligent transducers (not shown). The system bus 54 has four conductors, two of which carry the same digital data in a mirrored form.

System bus 54 also has a +5 volt power supply conductor and a system ground reference conductor.

2.0 Detailed description of the intelligent transducer

The function of the vibrating wire intelligent transducer 50 presently described is to read, record, receive instructions and transmit upon command digital data related to the frequency of vibration of a taut steel wire which has been fixed to a structural member. A typical vibratory wire strain gauge is shown in U.S. Pat. No. 4,074,565 assigned to the assignee of this invention. The change in stress of the structural member is proportional to the change in stress of the taut steel wire, and this is mathematically related to the change in frequency of the taut steel wire. By comparing the present frequency with a previously obtained frequency, the change in stress of the structural member can be calculated. The intelligent transducer is programmable and is designed to communicate digitally with a data-gathering computer or central control device or controller over a communication bus 54. The communication bus 54 is capable of serving many intelligent transducer modules which are connected in parallel to the bus.

While the intelligent transducer described in this preferred embodiment senses and communicates changes in stress of a structural member, other intelligent transducers incorporating different transducer sections, as will be described in detail below, may be similarly designed, such as temperature sensors, direction sensors, acceleration sensors, inclinational or gravity sensors, composition and pH sensors and the like. Those skilled in the art will quickly grasp the fact that any physical or chemical measurement that can be reduced to an electrical signal is within the scope of this invention and can be practiced by suitably interfacing the electrical signal resulting from a physical measurement to a microprocessor hereafter described, in an analogous manner detailed in this preferred embodiment.

2.1 Overview of intelligent transducer circuitry

Figure 2:
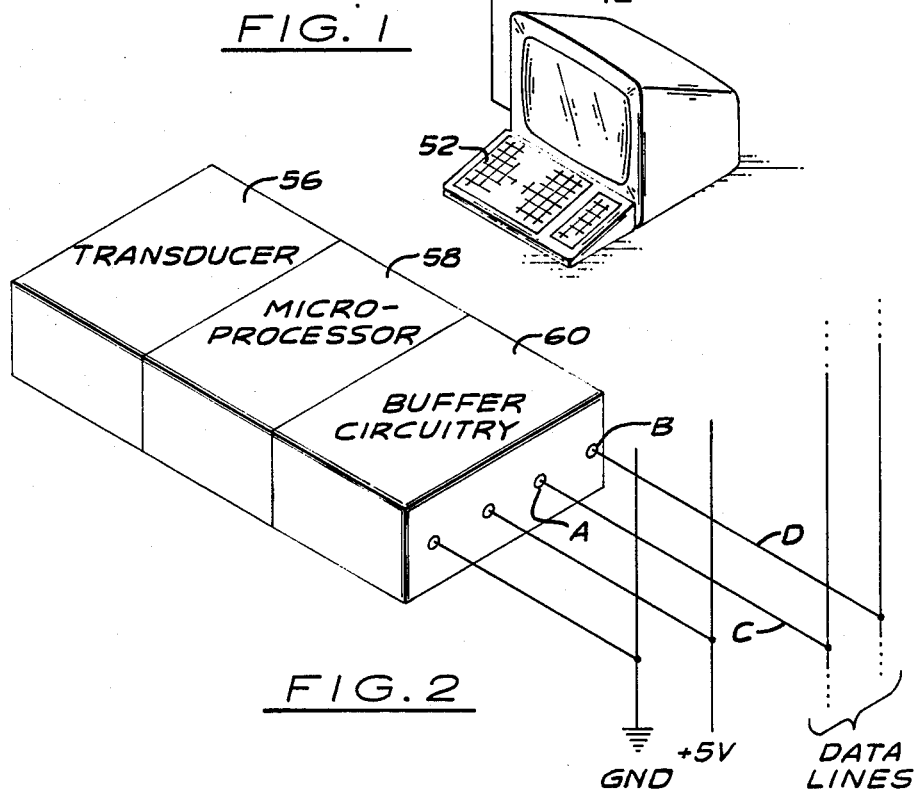
FIG. 2 is a simplified block diagram of the elements of an intelligent transducer used in this invention.

As FIG. 2 discloses, each intelligent transducer module is composed of three basic sections: the transducer 56, a microprocessor 58 and a buffer circuit 60. Transducer 56 makes a physical measurement, converts the physical measurement into an electrical signal, filters and modifies the signal into a form compatible with one or more input ports of the microprocessor 58. The microprocessor 58 detects the data received from the transducer section 56, performs data calculation and data reduction calculations, generates digital data, stores the data, receives instructions and commands and transmits the digital data according to internal instructions and external commands. A buffer circuit 60, controlled by the microprocessor, directs the incoming and outgoing data between the input/output data ports of the microprocessor and the input/output data ports A and B of the intelligent transducer. As will be explained later, the intelligent transducer data ports A and B communicate through the communication bus 54 in parallel data lines C and D with all the other intelligent transducer data ports A and B to the central controller 52.

The communication bus 54 is a common conducting means to conduct the incoming messages and data between the controller 52 and the several intelligent transducers on the network. The bus 54 can also provide power and ground lines. While this invention contemplates the use of a single data carrying channel to communicate the instructions and the data between the intelligent transducers and the central controller, as will be explained in detail below, a preferred embodiment described herein employs a pair of conducting wires or data lines referred to collectively as a data communication bus, each data line conducting the same information between the intelligent transducers and the central controller, the data on one data line mirroring the data on the other data line.

A preferred embodiment employs a +5 volt power supply 44 to energize the intelligent transducer's circuits and a common ground line. Although this embodiment describes the power and ground lines distributed together with the two data lines, it is obvious that each intelligent tranducer can be separately powered and grounded according to the needs and limitations of the system.

It is obvious that additional features may also be incorporated into the data communication bus which are not described in this preferred embodiment. The usefulness of these features are related to the particular applications of the system. For example, using known art the data transferred between the intelligent transducers and the central computer may be carried by radio, microwave, laser or other data transmission means.

2.1.1. Transducer Circuit

Figure 3A:
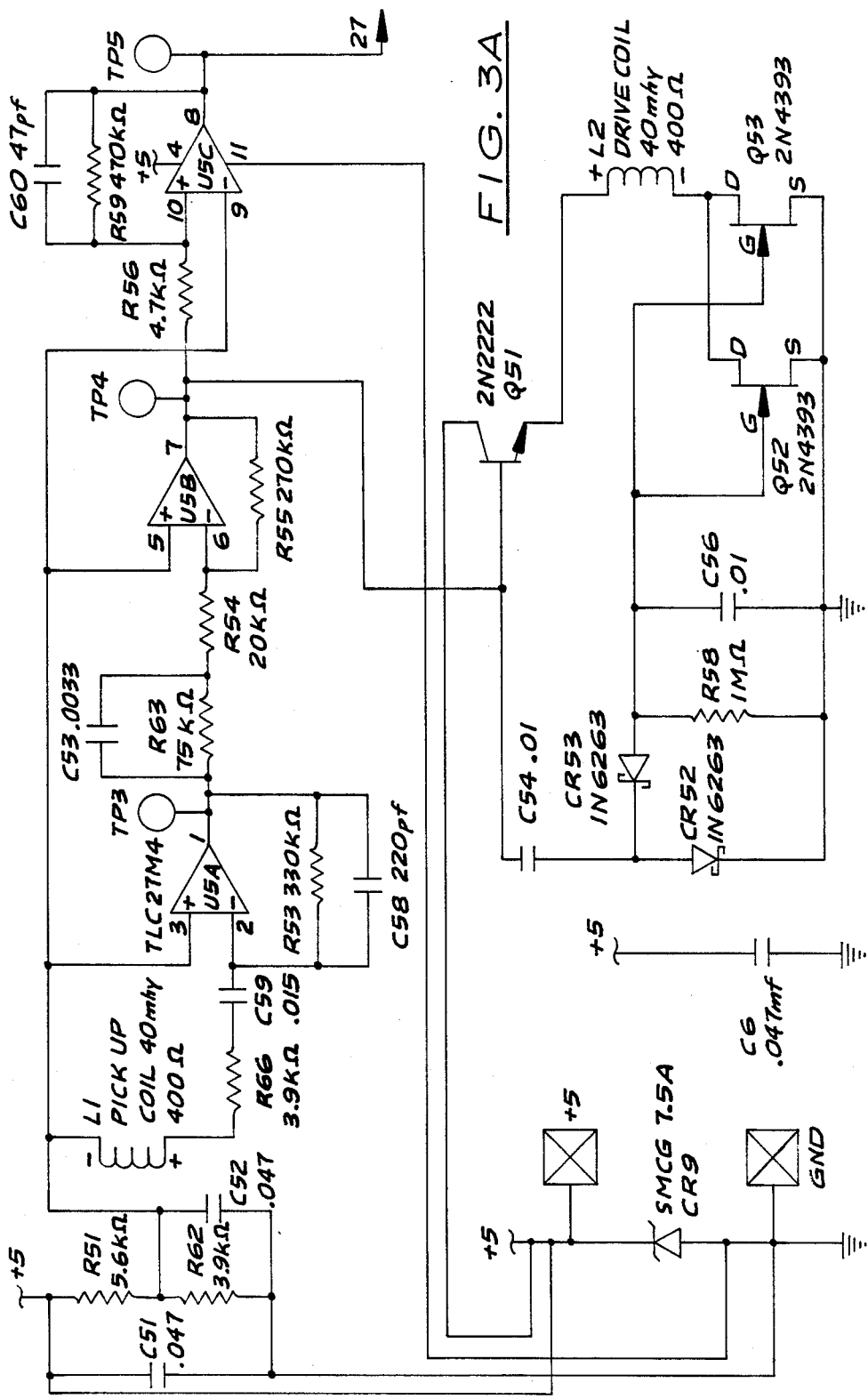
FIGS. 3A-3C is a schematic diagram of the intelligent transducer module of this invention.

Referring to the detailed intelligent transducer schematic FIG. 3A, resistors R51 and R62 form a voltage divider between a +5 volt power supply and ground to provide an intermediate reference voltage level for the amplifiers U5A, U5B and U5C. A detector circuit detects electromagnetic oscillations of a vibrating steel wire (not shown), filters, amplifies and shapes the oscillations into pulses in the following way: An electromagnetic signal induced by vibration of taut steel wire at coil L1 oscillates above and below the reference voltage level which is approximately four-tenths the +5 volt power supply voltage. Capacitor C51 and C52 filter noise and high frequency components from the signal to ground. The reference voltage level is conducted to the negative side of an induction pickup or sensor coil L1 which is proximate to the taut steel wire within a vibrating wire strain gauge transducer assembly (not shown). U.S. Pat. No. 4,074,565 fully describes the details of a vibrating wire strain gauge assembly suitable for use herein and is hereby incorporated by reference. The reference voltage level is also conducted to the positive input of U5A pin 3, the positive input of U5B pin 5 and the negative input of U5A, pin 9, U5A, U5B, and U5C are operational amplifiers. A signal induced at coil L1 by the vibrating wire strain gauge assembly is conducted from the positive side through resistor R66, capacitor C59 and to negative input of U5A, pin 2. The signal output of U5A, pin 1, is determined by the ratio of resistance across resistor R53 and resistor R66, and its frequency response is determined by capacitor C58 and capacitor C59 which are selected in this embodiment to cover the frequency band from 700 hertz to 2600 hertz. Filter network composed of capacitor C58 and resistors R53 connected between U5A negative input pin 2 and output pin 1 also comprise an additional noise and frequency filter.

The output from amplifier U5A pin 1 can be measured at test point TP3 and is conducted, in parallel through filter network capacitor C53 and resistor R63 and then conducted through coupling resistor R54 to negative input of U5B pin 6. Feedback resistor R55 is connected between the negative input pin 6, and the output 7 of U5B. The gain of this stage is determined by the ratio of resistors R55 and R54 plus R63 with frequency response determined by filter network composed of capacitor C53 and resistor R63. The output signal of U5B at pin 7, may be conveniently measured at test point TP4.

The oscillating signal output on U5B pin 7 is conducted through coupling resistor R56 to the positive input pin 10, U5C. Capacitor C60 and resistor R59, connected in parallel between the U5C output pin 8, and positive input pin 10 provide pulse shaping for the signal and provide hysteresis feedback to the amplifier U5C whenever the input signal on U5C pin 10 approximates the reference voltage level.

Figure 3B:
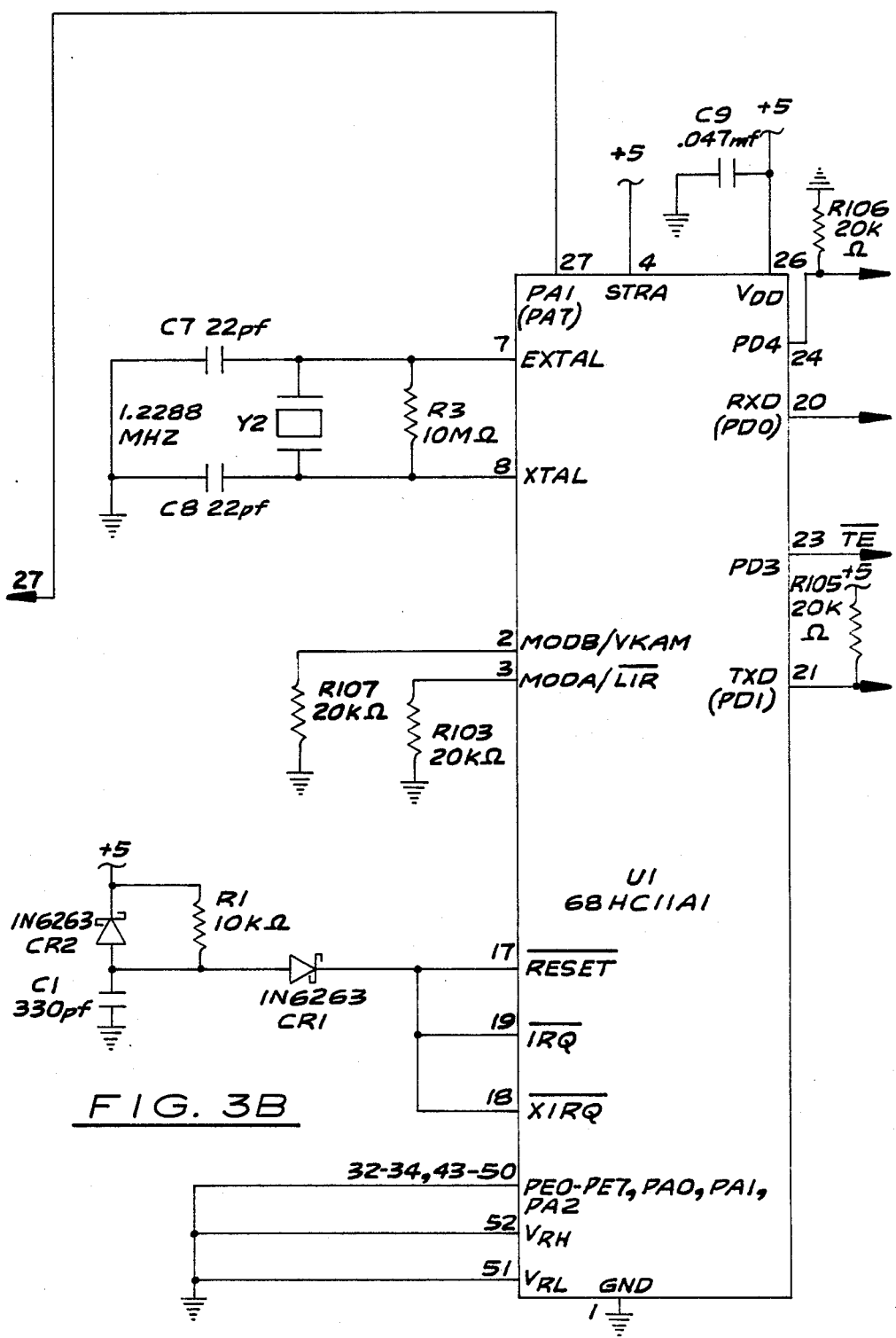

Digital-like pulses, of the same frequency as the oscillating frequency of the taut steel wire within the vibrating wire strain gage assembly, at U5C output pin 8 are fed into a pulse accumulator input (PAI) of a single-chip microprocessor U1, FIG. 3B. These pulses are summed for a set length of time; the number of pulses counted in this period will be related to the frequency of the vibrating wire, and thus to the stress or structural behavior at the selected site.

The detector circuit controls a driver circuit to prevent overdriving the vibrating wire within the vibrating wire strain gauge assembly. The signal detected at the output of U5B pin 7 regulates the current through coil L2 to prevent overdriving the vibrating wire. The oscillating signal at output pin 7 of U5B is fed into the base of transistor Q51, to control the current flowing from the +5 volt power supply to the vibrating wire drive coil L2, through the collector and emitter junctions of Q51. The current through coil L2 is further controlled by a pair of paralleled field effect transistors Q52 and Q53 conducting through the drain-source leads, from the negative side of coil L2 to ground. A peak detection circuit composed of capacitor C54 which joins the base lead of Q51 to the negative side of diode CR53 and the positive side of diode CR52, and peak storage capacitor C56 with bleed off resistor R58 which joins the gates of Q52, Q53 and the positive side of diode CR53, provides a feedback signal to limit current through drive coil L2. Resistor R58, connected across capacitor C56, is selected for optimum stability of the feedback signal which controls the amplitude of vibration of the taut steel wire.

2.1.2 The Microprocessor

The data processing functions of the intelligent transducer 50 are embodied in a single chip microprocessor U1 FIG. 3B. The microprocessor used in this embodiment is manufactured by Motorola, Inc., part number 68HC11A1. The operational characteristics are fully described in a technical summary available at Motorola Semiconductor, Inc., a subsidiary of Motorola, Inc., 3501 Ed Blustein Blvd., Austin, Tex. 78721. This particular microprocessor U1 features a 8 kilobyte Read Only Memory (ROM), 512 bytes of electrically erasable programmable read only memory (EEPROM) and 256 bytes of static Random Access Memory (RAM), a serial communications port, a timer, a pulse accumulator input, and several other input/output ports all integrated into a compact single chip. While these features simplify the preferred embodiment, microprocessor chips of other manufacturers with similar functions could also be used within the scope of this invention. Further, since the embodiment described herein relates a frequency of a vibrating wire to a physical deformation or strain, those familiar with this art can realize other embodiments within the scope of this invention by appropriately designing interface circuitry to a microprocessor or its equivalent. Consistent with the operating characteristics of the microprocessor U1, other embodiments of the intelligent transducer within the scope of the invention can be realized by a person skilled in the pertinent art, to monitor other physical parameters relating to, for example, temperatures, pressures, slope changes, humidity, acceleration, velocity, pH, chemical composition and the like. These other embodiments may or may not use the particular in/out ports on the microprocessor which are used in the presently described embodiment. The in/out ports on the microprocessor, used on any embodiment will depend upon the electrical characteristics of the detector.

Conforming to the "power-on" operational requirements of microprocessor U1 required to set U1 into the correct operating mode, MODB/VKAM port, pin 2 and MODA/$\overline{\text{LIR}}$, pin 3 must be held near 0 volts. This is accomplished with pull-down resistors R107 and R103. Crystal Y2 interconnects U1, EXTAL port pin 7 and XTAL port pin 8 of the microprocessor U1 to provide an external frequency for operating the microprocessor 1.2288 megahertz. Tuning capacitors C7 and C8 are connected from ground to pin 7 and to pin 8 of the microprocessor respectively. Resistor R3 connects pin 7 to pin 8 of the microprocessor.

Conforming to the operational characteristics of the microprocessor U1, $\overline{\text{RESET}}$ input pin 17, $\overline{\text{IRQ}}$ pin 19 and $\overline{\text{XIRQ}}$ pin 18 are all connected to the negative side of Schottky diode CR1; the positive side of CR1 is connected to the positive side of another Schottky diode CR2, which feeds to the +5 volt power supply. The positive side of CR1 also goes to the +5 volt power supply through resistor R1 and is connected to ground through capacitor C1. Unused PE0-PE7 ports and PA0-PA2 ports at pins 32 through 34, pin 43 through 50 and reference voltage ports VRH and VRL at pins 51 and 52 are interconnected and tied to ground. Conforming to the operation requirements of this microprocessor for the present embodiment, ground port, pin 1 is connected to ground and STRA, pin 4 is connected directly to the +5 volt power supply. Power input port VDD, pin 26 is connected to the +5 volt power supply, and connected to filter capacitor C9 to ground.

2.1.3 Transmit/Receive Buffer

In this preferred embodiment the intelligent transducer communicates to data line A and line B of a data bus through receive data RxD (PD0) port pin 20 and transmit data TxD (PD1) port pin 21. The transmit enabling port $\overline{\text{TE}}$ (PD3) pin 23 controls the buffer circuitry interconnecting the receive and transmit data ports, RxD and TxD, and data line A and B ports of the data bus. The combination of signals at TxD, RxD, and PD3 ports enables the microprocessor to be set to the program mode, receive data mode or transmit data mode.

The transmit data port TxD pin 21 is interfaced through the buffer circuit U3B which is switched on only when directed by the microprocessor. The buffer circuitry used in this preferred embodiment is a single, tri-statable inverting buffer module 74HC368 containing six individual tri-state buffers and two buffer control elements. The output of each tri-statable buffer will be either high, that is at approximately +5 volts, or low, that is approximately 0 volts, or inactive, where the output is functionally disconnected. Referring to the schematic FIG. 3C, one third portion of the buffer module referred to as U3A is used to define the RxD state at pin 20. The other two thirds portion of the buffer module is used to condition and transfer the signal from the TxD port pin 21. The enabling element for the four inverting buffers of U3B is controlled by the transmit enable port ($\overline{\text{TE}}$) PD3 port pin 23. Two inverting buffers U3A are tied serially through input pins 12 and then 14 and output pins 11 and 13. When the level of the enabling element at pin 15 is low, by say, momentarily grounding TP1 (PGM), the outputs from the two inverting buffers at pin 11 and pin 13 become enabled. The output at pin 11 from the inverting buffer with input at pin 12 is returned as input of the other inverting buffer with input at pin 14. The output at pin 13 of inverting buffer which is fed to RxD is thus twice inverted from the TxD signal, fed to input pin 12.

The enabling input pin 15 of the inverting buffer U3A is connected to 0 volt ground through resistor R106, 20 kohm, and to test point TP1, and to in/out port PD4, pin 24 of the microprocessor U1.

2.1.4 Receiving Mode

Referring to FIG. 1, a central controller 52 broadcasts a command signal on the data bus 54 which is received by all the intelligent transducers 50 on the data bus 54 as a digital serial signal at input ports A and B. (FIG. 2) The signals at A and B are mirrored so that when the signal at A is high, the signal at B is low and vice versa. While the invention contemplates a common single conductor data bus to interface the controller with all the remote transducers, the preferred embodiment herein described employs a pair of insulated conductors as a common data bus to interface the controller with all the remote transducers. Although a single conductor data bus can interface the intelligent transducer with the controller as contemplated by this invention, by using the pair of insulated conductors, each conductor transmitting the same data, but mirrored with respect to each other, induced noise and voltage transients will cancel out. The intelligent transducer 50 in this embodiment has a comparator circuit to assure that the data signal is received at the intelligent transducer in a mirrored state, and if not, the received data signal will not be conducted to the microprocessor U1.

Figure 3C:
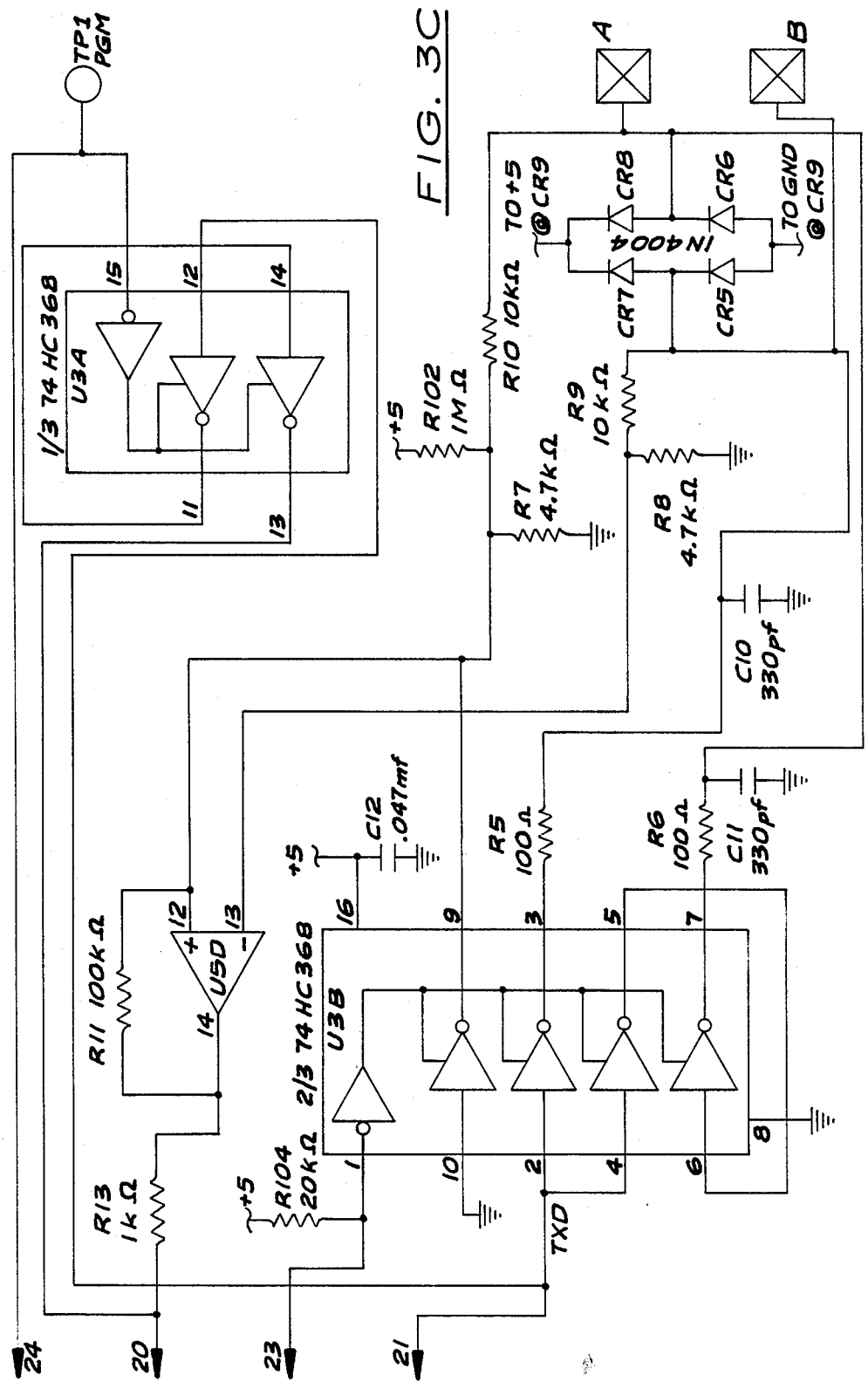

Referring to FIG. 3C, the intelligent transducer schematic, an incoming signal from the data bus at port A is conducted through input resistor R10 to the positive input side of operational amplifier U5D pin 12 and through resistor R7 to ground. Resistor R7 and resistor R10 divide the incoming signal from port A. U5D pin 12, is also connected to +5 volts through a resistor R102, to define the U5D output should port A and port B be disconnected.

Similarly, the incoming signal from the data bus at port B is conducted through input resistor R9 to the negative input of operational amplifier U5D pin 13 and through resistor R8 to ground. Resistor R8 and resistor R9 divide the incoming signal from port B. Operational amplifier U5D is used in this configuration as a signal comparator and will produce an output at pin 14 whenever the input signals at pin 12 and 13 are different. Feedback through resistor R11, interconnecting U5D input pin 12 and output pin 14, provides hysterisis to prevent false triggering when the input signals from port A and port B are identical.

The signal output at pin 14 of the comparator U5D follows the difference between input signals from port A and port B as applied to pin 12 and pin 13. The signal output of comparator U5D, pin 14, connects through isolation resistor R13 to the receive data input, RxD port, pin 20 of U1. Resistor R13 prevents interference by U5D output at pin 14 when the system is initially set in the normal (non-programming) mode.

2.1.5 Transmit Mode

The other portion of the tri-statable inverting buffer module U3B containing four inverting buffers and an enabling element is used to control the information flow from the microprocessor U1, transmit data port TxD to the data bus 54, ports A and B. The controlling element is enabled by transmit enable $\overline{TE}$ signal received from PD3 port, pin 23 of the microprocessor which enables the four inverting buffer elements of U3B when low. In this condition, serial data output is transmitted from the microprocessor at the TxD port pin 21 to two inverting buffer inputs of U3B at pins 2 and 4. The TxD signal fed into U3B input pin 2 exits pin 3 in the inverted state and becomes the data signal, conducted through R5 to data line B of the data bus 54. The TxD signal fed into the inverter input at pin 4 exits pin 5 in an inverted state. This inverted signal is fed back into inverter input at pin 6 to exit on pin 7 as TxD doubly inverted, or noninverted. This signal becomes the data signal conducted through R6 to data line A of the data bus 54. This circuit creates the mirrored signals on the data bus while effectively isolating TxD port from the data bus whenever transmit enable signal $\overline{TE}$ at pin 23 is high. Data bus port B is bypassed to ground through capacitor C10 for filtering. Data bus port A is bypassed to ground through capacitor C11 for filtering. Input pin 10 of buffer U3B is tied to ground and the inverted high output on pin 9 is fed to input pin 12 of the comparator U5D. This arrangement disables the commparator U5D whenever a transmit enable low signal is applied to the buffer control element input pin 1 from PD3 of U1. In this state the data is transmitted onto the bus without the data communicating to input RxD port of U1. Transmit enable pin 23 is also connected to +5 volt power supply through resistor R104 and TxD port pin 21 is connected to the +5 volt power supply through resistor R105 to define these ports during the reset phase. U3B, pin 8 is the module ground and U3B module power supply pin 16 is connected to the +5 volt power supply as required by the specifications of the tri-statable inverting buffer module 74HC368. Noise filter capacitor C12 is connected from pin 16 to ground.

2.1.6 Programming Mode

In order to program the Electrically Erasable Program Read Only Memory (EEPROM), which is the microprocessor's erasable programmable memory with the operating instructions for the microprocessor, a particular sequence of operations must be performed as are specified by the operating characteristics of the microprocessor U1.

The enabling input U3A pin 15 normally stays low or at about 0 volts when power is first applied, then is set high by PD4, when instructed by the program; but to program the microprocessor the input of the buffer enabling element, pin 15 is held high by holding TP1 to +5 while the +5 volts power is applied to the microprocessor. This connection prevents the signal as described above sent from TxD port at pin 21 from being fed back through the U3A buffer into the Rxd port at pin 20. By its internal design, this allows the microprocessor to receive a program through its RxD port pin 20 from the data communication bus at ports A and B. The microprocessor is then programmed by inserting instructions into A and B port of the data bus.

After a high voltage is applied to input pin 15, disabling element of inverting buffers U3A, thereby preventing the signal from output TxD at pin 21 from reaching RxD at pin 20 of the microprocessor, a byte equal to FF hexidecimal at 1200 BPS is sent through port A and port B, causing the microprocessor to retain a serial port clock rate of 1200 BPS for subsequent data input; then 256 bytes of programming instructions can be input through port A and B, the instruction data transmitted to port B mirrored to the instruction data transmitted to port A, to be received by the microprocessor through the comparator U5D and stored in U1's internal Random Access Memory (RAM). These instructions program the microprocessor as to how to receive the working program to be stored in the microprocessor's EEPROM.

2.1.7 Voltage Surge Protection Circuit

The preferred embodiment also incorporates an overvoltage surge protector circuit composed of PN silicon transient voltage suppressor CR9 and diodes CR5, CR6, CR7, CR8 arranged in a bridge fashion, the positive side of CR5 and CR6 connect to ground at the positive side of CR9, the negative side of diode CR6 connects to port A of the data bus 54 and to the positive side of diode CR8, the negative side of diode CR5 connects to port B of the data bus 54 and to the positive side of diode CR7. The negative sides of diodes CR7 and CR8 connect to the +5 volt power supply at the negative sides of CR9. C6 is connected directly to positive and negative sides of CR9 to shunt high frequency currents or fast surges prior to activation of CR9. With this arrangement, the intelligent transducer is protected from voltage surges within peak current ratings of surge protector and diodes.

Figure 21:
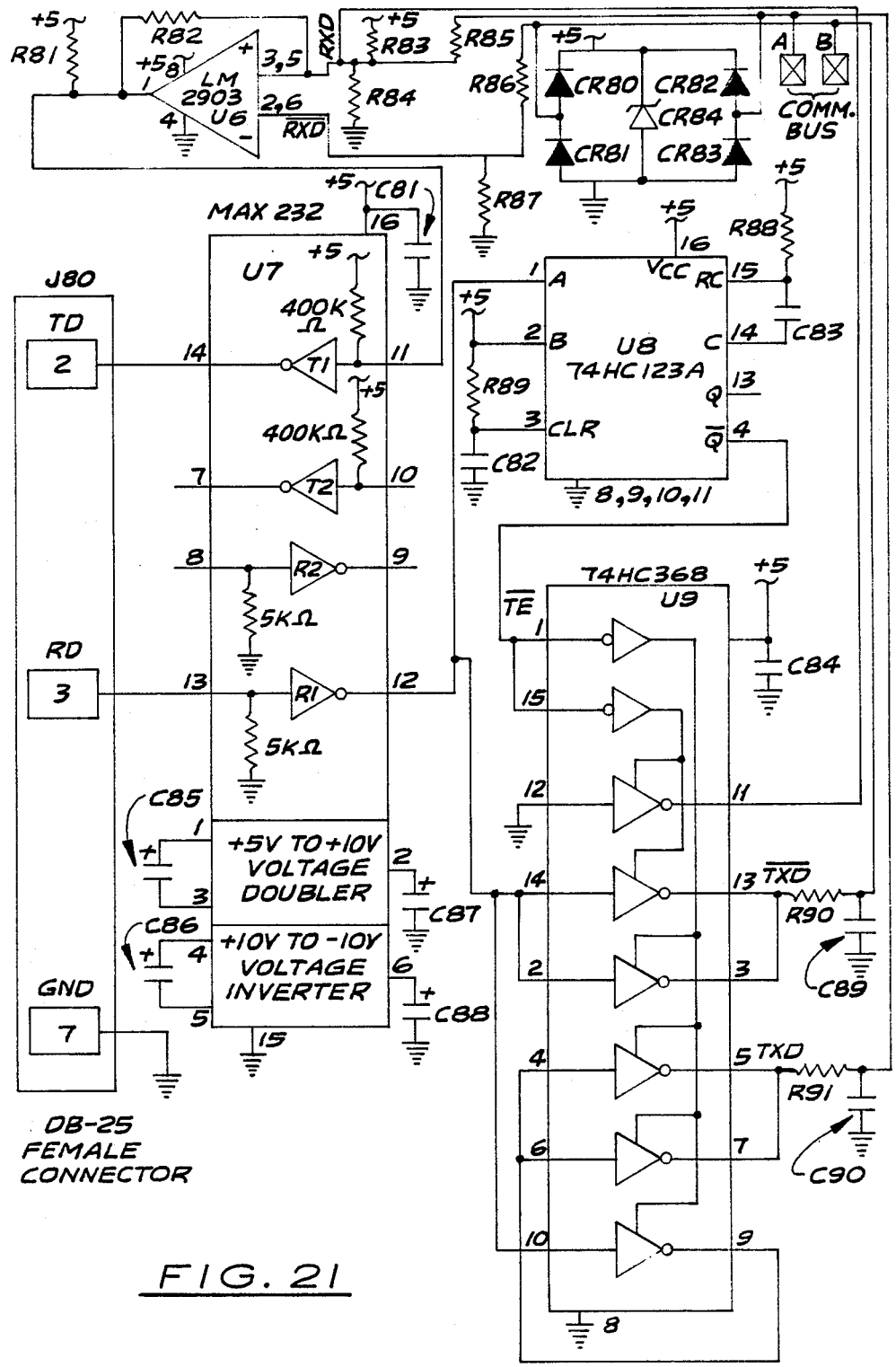
FIG. 21 is a schematic diagram of the interface adapter.

2.1.8 Detailed Description of the Interface Adapter FIG. 21

The function of the interface device 42 whose schematic diagram is shown in FIG. 21 is to receive signals from the RS-232C serial port of the controller means 52 and transmit those signals on the communication bus 54 to the intelligent transducers 50, and to receive signals from an intelligent transducer 50 on the communication bus 54 and transmit those signals to the RS-232C serial port of the controller means 52.

While the interface adapter in this embodiment describes a circuit to interface RS-232C signals and signals for this embodiment of the intelligent transducer, persons skilled in the art could design other adaptors to interface computer port signals to other intelligent transducer embodiments.

As FIG. 21 discloses, the interface adapter has a DB-25 connector J80 through which it receives RS-232C signals from the controller on pin 3, RD and through which it sends RS-232C signals to the controller on pin 2, TD. Both signals are referenced to ground on pin 7, GND, of J80. U7 is a 5 volt powered RS-232C transmitter and receiver with on-board voltage converters and is a proprietary circuit produced by Maxim Integrated Products, Inc., Sunnyvale, Calif. Capacitors C85 and C86, connected from pin 1 and 3 of U7 and from pins 4 and 5, and capacitors C87 and C88, connected from pin 2 and pin 6 to ground, are filter capacitors for the voltage converters. Power supply connections are at pin 16 for +5 volts and at pin 15 for ground.

The incoming signal from RD is received at receiver input pin 13 of U7 and is inverted and sent out pin 12 to pin 1 of U8 and to pins 2, 14 and 10 of the tri-statable inverting buffer U9. U8 is a retriggerable monostable output device which presents a low level enabling pulse from its $\overline{Q}$ output at pin 4 to the $\overline{TE}$ enabling element inputs at U9 pins 1 and 15. U8 is triggered whenever a negative transition caused by receipt of signals at J80 pin 3, occurs at trigger input pin 1, and the duration of the negative pulse at $\overline{Q}$ is controlled by the RC network of resistor R88 and capacitor C83. The transmit enabling port $\overline{TE}$ controls the buffer circuitry interconnecting the received signal and the communication bus data ports A and B, and when it is low, the inverting buffers of U9 are enabled. This allows the received signal being presented at pin 2, 14, and 10 to be presented as inverted signals at output pins 13, 3, and 9. The signal from pin 9 is connected to buffer input pins 4 and 6, and the twice inverted signal is presented as outputs at TxD on pins 5 and 7, thus mirroring the outputs at TxD on pins 13 and 3. These mirrored signals TxD and $\overline{TxD}$ are conducted through resistors R91 and R90 to communication bus ports A and B, and these ports are filtered to ground through capacitors C90 and C89. Also, when $\overline{TE}$ is low enabling the inverting buffer U9, the grounded input at input pin 12 is inverted to a high level at output pin 11 and is presented at RxD input pins 3 and 5 of U6, effectively disabling any signals from being output from U6. Capacitors C81 and C84 filter the 5 volt power supply to the RS-232C transmitter and receiver module U7 and to the inverting buffer module U9. The input signal on port A is conducted through resistor R85 to positive input pins 3 and 5 of operational amplifier U6 and through resistor R84 to ground. The input signal on port B is conducted through resistor R86 to negative input pins 2 and 6 on U6 and through resistor R87 to ground. The resistor pairs consisting of R85, R84 and R86, R87 divide the input from ports A and B equally. The output pin 1 on U6 is returned through resistor R82 for hysterisis to eliminate extraneous noise when inputs from port A and B are identical. Resistor R83 is connected to pins 3 and 5 and to +5 volt to control output when port A and B are disconnected. Resistor R81 provides pull up to +5 volt as recommended by manufacturer of LM2903. The output pin on U6 is connected to input pin 11 of inverting buffer and RS-232C driver U7 with output pin 14 connected to transmitted data, pin 2 on J80.

Power input for intelligent transducers and interface adapter for the preferred embodiment is from an external regulated 5 volt power supply. The +5 volt input is connected to the negative lead of transient surge suppressor CR84, to 5 volt conductor connected to the plurality of intelligent transducers, and to power pins of U6, U7, U8, and U9, as well as capacitors C81, C84, and resistors R81, R83, R88, and R89. The ground input GND is connected to the positive lead of transient surge suppressor C84, to GND conductor connected to the plurality of intelligent transducers, and to ground pins of U6, U7, U8, and U9 as well as capacitors C87, C88, C89, C90, C84, C82, C81 and resistors R84 and R87 and pin 7 GND on J80. Port A is connected to negative lead of diode CR83 and positive lead of diode CR82. Port B is connected to negative lead of diode CR81 and positive lead of diode CR80. The negative leads of diodes CR80 and CR82 are connected to +5 volt at CR84. The positive leads of diodes CR81 and CR83 are connected to ground at CR84. The combination of transient suppressor CR84, and diodes CR80, CR81, and CR83 protect the circuit from transient overvoltage within the peak current ratings of the transient suppressor and diodes.

2.1.9 List of Hardware in Preferred Embodiment

It will be appreciated that specific design details may be executed by skilled persons using known techniques. By way of example, the following component values illustrate specifically the best mode presently contemplated for carrying out a preferred embodiment of this invention:

| | TRANSDUCER CIRCUIT |
|---|---|
| R51 | 5.6 kilohm |
| R62 | 3.9 kilohm |
| U5A, U5B, U5C, U5D | Texas Instruments TLC27M4 |
| Coil L1 | 40 millihenry, 400 ohm |
| C51 | .047 microfarad |
| C52 | .047 microfarad |
| R66 | 3.9 kilohm |
| C59 | .015 microfarad |
| R53 | 330 kilohm |
| C58 | 220 picofarad |
| R63 | 75 kilohm |
| C53 | .0033 microfarad |
| R54 | 20 kilohm |
| R55 | 270 kilohm |
| R56 | 4.7 kilohm |
| C60 | 47 picofarad |
| R59 | 470 kilohm |
| U1 | Motorola 68HC11A1 |
| Q51 | 2N2222 |
| Coil L2 | 40 millihenry, 400 ohm |
| Q52 | 2N4393 (FET) |
| Q53 | 2N4393 (FET) |
| C54 | .01 microfarad |
| CR52 | 1N6263 |
| CR53 | 1N6263 |
| C58 | 1.0 megohm |
| C56 | .01 microfarad |
| C6 | .047 microfarad |
| | MICROPROCESSOR CIRCUIT |
| R107 | 20 kilohm |
| C7 | 22 picofarad |
| C8 | 22 picofarad |
| R3 | 10 megohm |
| R103 | 20 kilohm |
| CR1 | 1N6263 |
| CR2 | 1N6263 |
| R1 | 10 kilohm |
| C9 | .047 microfarad |
| Y2 | 1.2288 megahertz crystal |
| | BUFFER CIRCUIT |
| R10 | 10 kilohm |
| U5D | (See Transducer Circuit) |
| R7 | 4.7 kilohm |
| R102 | 1 megohm |
| R9 | 10 kilohm |
| R8 | 4.7 kilohm |
| R11 | 100 kilohm |
| R13 | 1 kilohm |
| R5 | 100 ohm |
| R6 | 100 ohm |
| C10 | 330 picofarad |
| C11 | 330 picofarad |
| R104 | 20 kilohm |
| R105 | 20 kilohm |
| R106 | 20 kilohm |
| C12 | .047 micofarad |
| U3A/U3B | 74HC368 |
| | OVER-VOLTAGE PROTECTION CIRCUIT |
| CR5 | diode 1N4004 |
| CR6 | diode 1N4004 |
| CR7 | diode 1N4004 |
| CR8 | diode 1N4004 |
| CR9 | transient voltage suppressor SMCG 7.5A |

-continued

| INTERFACE ADAPTER CIRCUIT | |
|---|---|
| R81 | 10 kilohm |
| R82 | 100 kilohm |
| R83 | 1 megohm |
| R84 | 4.7 kilohm |
| R85 | 10 kilohm |
| R86 | 10 kilohm |
| R87 | 4.7 kilohm |
| R88 | 499 kilohm |
| R89 | 100 kilohm |
| R90 | 100 ohm |
| R91 | 100 ohm |
| C81 | .047 microfarad |
| C82 | .047 microfarad |
| C83 | .22 microfarad |
| C84 | .047 microfarad |
| C85 | 22 microfarad |
| C86 | 22 microfarad |
| C87 | 22 microfarad |
| C88 | 22 microfarad |
| C89 | 330 picofarad |
| C90 | 330 picofarad |
| CR80 | 1N4004 |
| CR81 | 1N4004 |
| CR82 | 1N4004 |
| CR83 | 1N4004 |
| CR84 | 1N6268A |
| J80 | DB-25 female connector |
| U6 | National Semiconductor LM2903 |
| U7 | Maxim MAX232 |
| U8 | 74HC123A |
| U9 | 74HC368 |

2.2 Program Overview—Controller Program FIG. 20

Figure 20A:
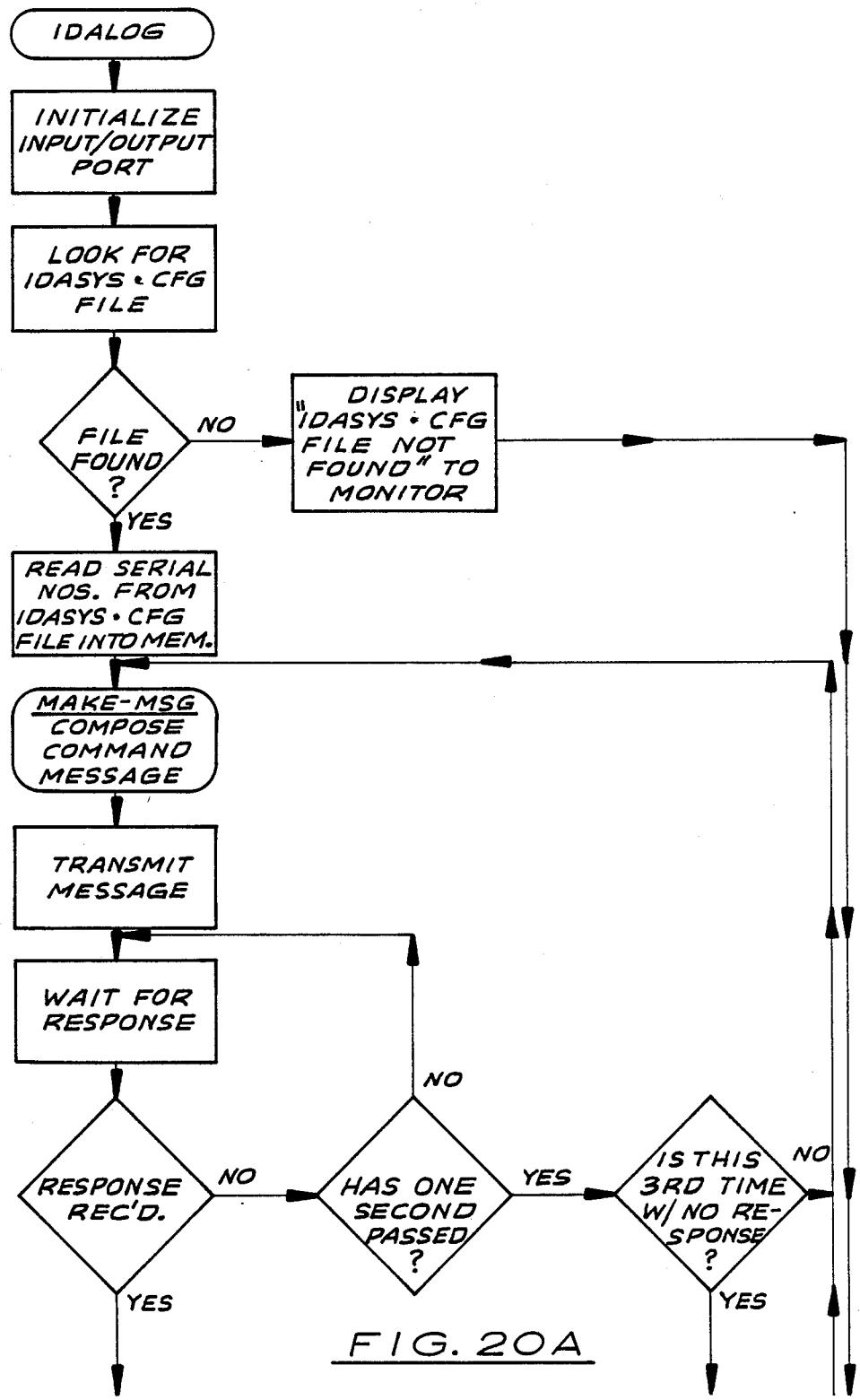
FIGS. 20A and 20B is a simplified block diagram of the Intelligent Data Logging (IDALOG) program for computer.
Figure 20B:
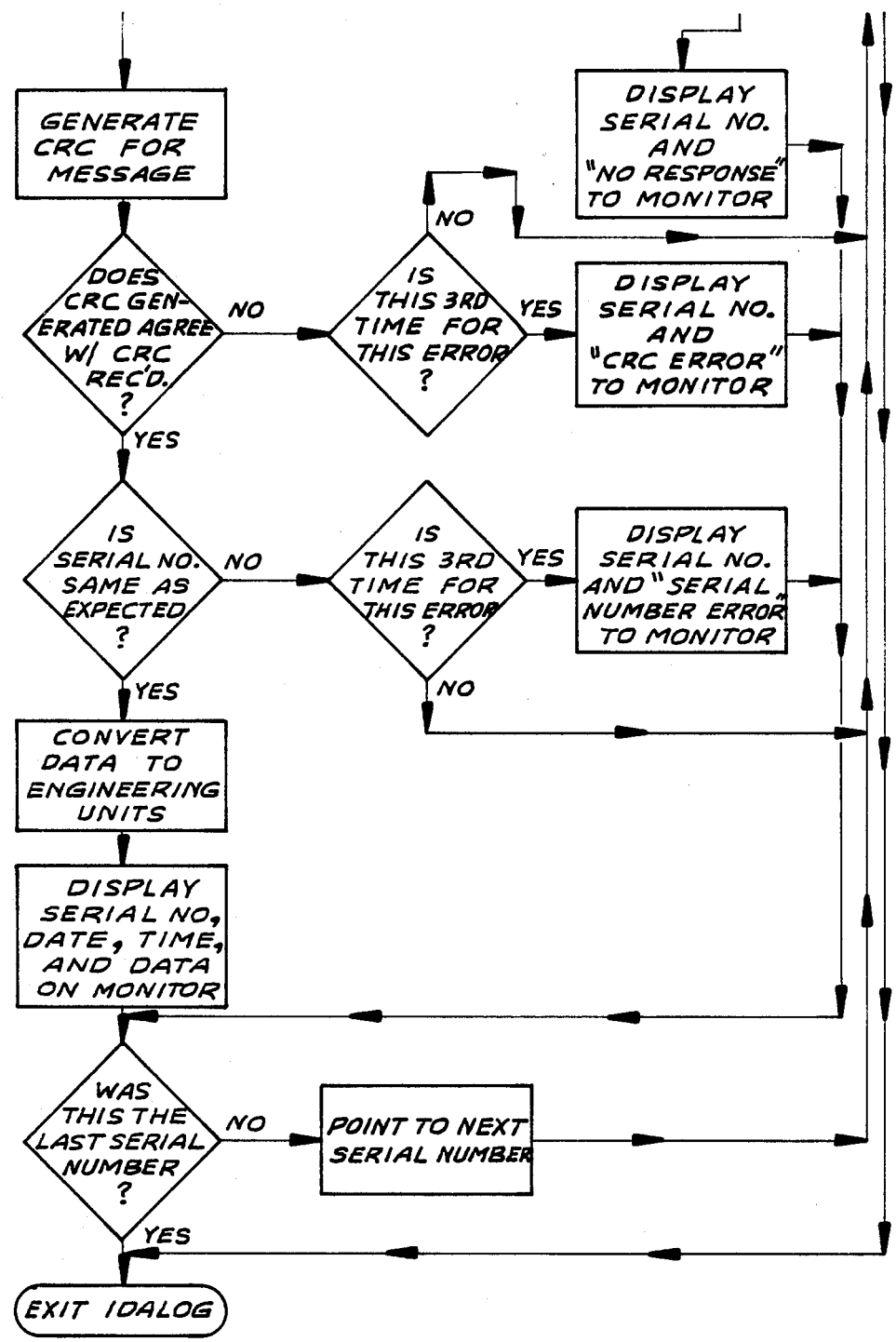

The preferred embodiment includes a simple program for foreground operation on a computer. The name of this program is IDALOG. It runs on a computer (called the controller) equipped with a standard RS-232C data Input/Output port. Its purpose is to send a message to a variable number of intelligent transducers, instructing each to take a reading and transmit that data back to the controller. The controller then displays the data on its monitor. A flow chart of this program is shown in FIGS. 20a and 20b. Skilled persons using known techniques can create programs with enhanced features such as alarm comparisons, background/real time operation, etc.

Each intelligent transducer module has a unique serial number programmed into it. In order for the IDALOG program to work, it must know the serial numbers of all intelligent transducer modules from which it is to read data. This is accomplished by reading a text file called IDASYS.CFG which contains those serial numbers. The IDASYS.CFG file can be created using any one of a number of readily available text editor or word processor programs.

When the user wants to take a set of readings, he runs the controller program, IDALOG, on his computer. The IDALOG program looks for the IDASYS.CFG file, and if it doesn't find it, the error message 'IDASYS.CFG file not found' is displayed on the monitor and the program terminates.

If the IDASYS.CFG file is found, the serial numbers are read from the file. Next a message containing a command to take a reading is transmitted to each intelligent transducer in turn through the serial Input/Output port (according to serial number) and the resulting data is received and displayed on the monitor.

The command messages transmitted from the controller to the intelligent transducer modules and the data messages received back from the modules both have the same format. A different format for messages could be used. For example, date and time not included, or serial number comes after message, etc. The format used for this embodiment is as follows:

SOH / # OF BYTES / SER. NO. / DATE / TIME / MESSAGE/ CRC.

SOH, This is the Start of Header code which is the first part of every message.

# of Bytes, This is a code which tells the receiving unit how many bytes to expect in the remainder of the message, excluding the CRC.

Ser. No., This is the unique serial number. Every intelligent transducer module receives the message, but only the one whose serial number matches that in the message responds.

Date, The IDALOG program uses the current date from the computer.

Time, The current time from the computer is also used.

Message, The message can be of variable length. This is the command if the controller originates the message or the data if the intelligent transducer module originates the message.

CRC, This is the Cyclic Redundancy Check code. This is a code which is generated by the transmitting unit, and it is a pattern of binary code which is highly dependent on the rest of the code in the message and its order in the message. Its purpose is to detect errors due to spurious electrical "noise" which may have been introduced between the transmitting unit and the receiving unit. All code in the message except the SOH and the CRC itself are used to determine the CRC.

After a command has been transmitted, the controller waits 1 second for a response message. If there is no response, the controller retries the process up to three times. If there still has been no response, the serial number and a 'NO RESPONSE' message are displayed on the controller monitor.

If there is a response, the controller checks the serial number and the CRC which have been received. (The controller generates its own CRC as the message is received.) If either or both do not agree with what is expected, this is an error condition, and the process is retried up to three times. If there is still an error, the serial number and a 'CRC ERROR' and/or 'SERIAL NUMBER ERROR' message is displayed on the controller monitor.

If the response is valid, the date, time and data are extracted from the message, the data is converted to engineering units, and displayed with the serial number on the controller monitor.

This process is repeated for all serial numbers in the IDASYS.CFG file, and the IDALOG program then terminates.

Figure 4:
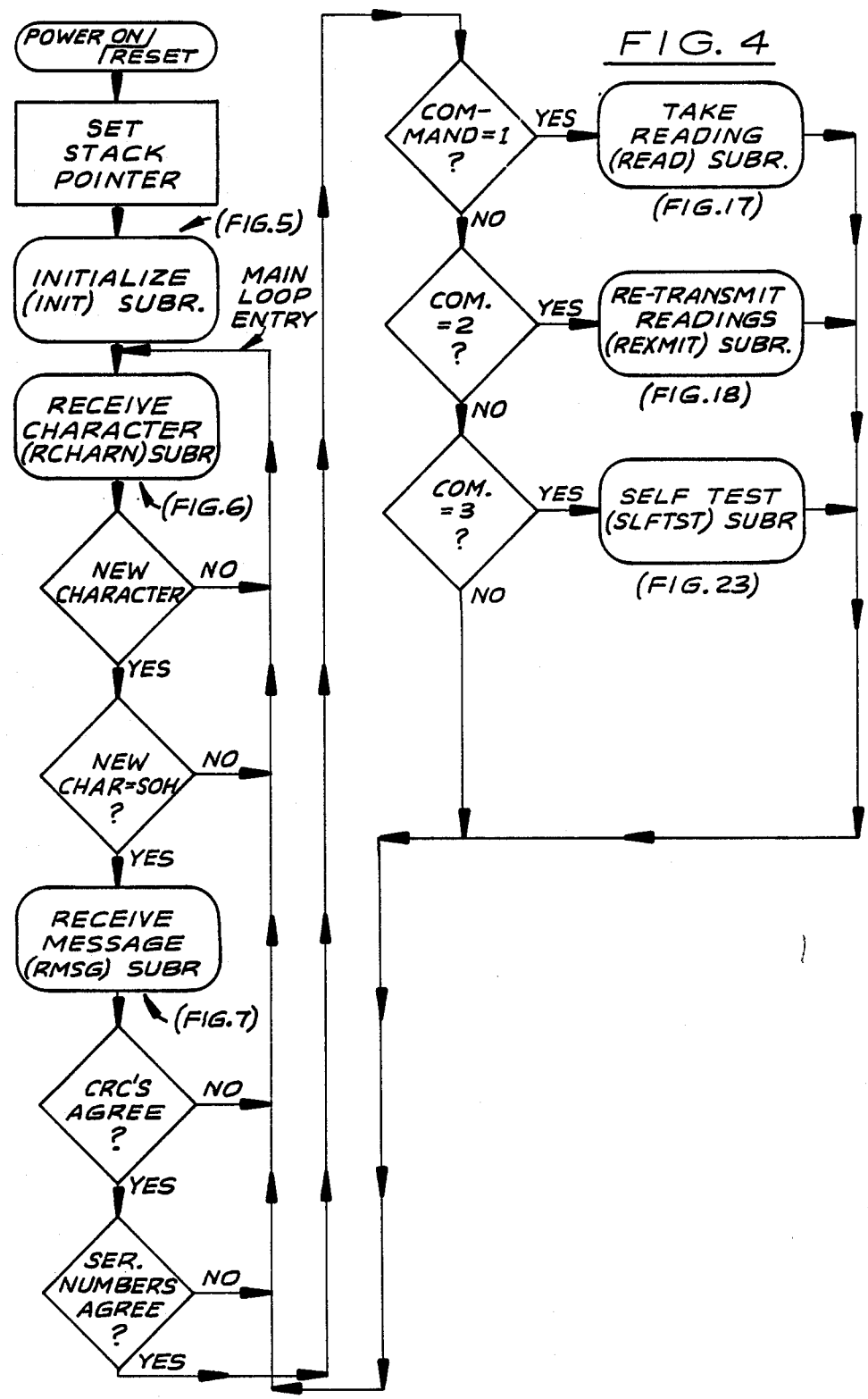
FIG. 4 is a simplified block diagram of the intelligent transducer program of this invention.

2.3 Intelligent Transducer Program Overview FIG. 4

FIG. 4 outlines the flow diagram of the various decisions, branches, routines and some of the subroutines used throughout the intelligent transducer program controlling the operation of the microprocessor U1.

Figures 5, 6:
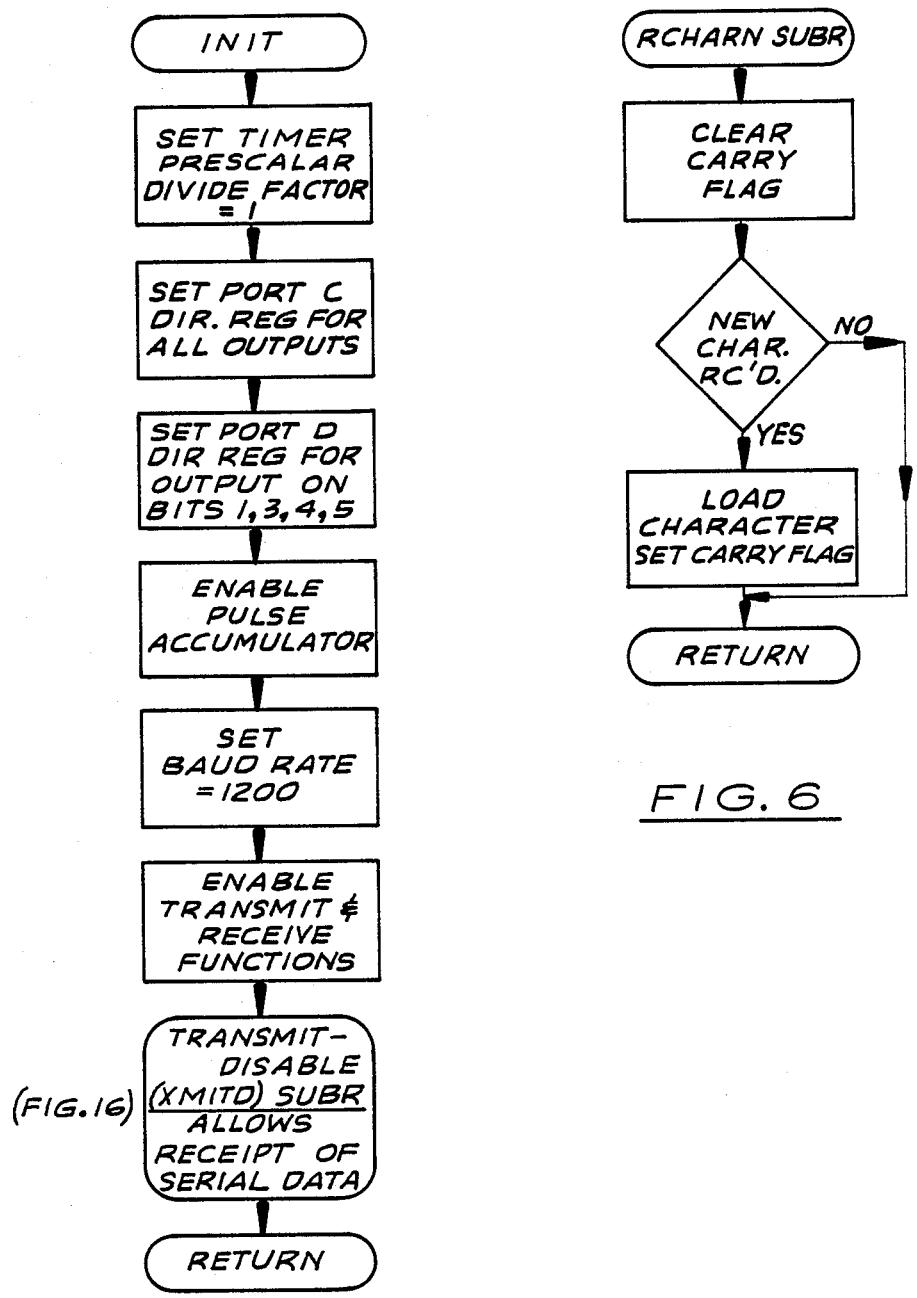
FIG. 5 is a simplified block diagram of the inialize (INIT) subroutine.
FIG. 6 is a simplified block diagram of the Receive Character (RCHARN) subroutine.

Once the power on/reset is initiated, the program sets a stack pointer. The stack pointer is used by the microprocessor to keep track of where it is in the program or subroutine. This is accomplished by placing particular values in the Random Access Memory (RAM) of the microprocessor. The program starts by performing an initialize (INIT) subroutine. The flow chart of the INIT is shown in FIG. 5. The INIT subroutine sets the different modes of operation in the microprocessor and sets the initial values as required by the operational parameters of the microprocessor, i.e. timers are set to certain values, clocks are set to specific rates as are required. Now the program is at the Main Loop entry point. This is the return point for most of the subroutines whenever a subroutine is completed or a particular condition is not satisfied. The receive character (RCHARN) subroutine is performed. The flow diagram of the RCHARN is shown in FIG. 6. The RCHARN subroutine reads each character received by RxD, pin 20 of the microprocessor U1. So long as a new character has not been received, the program returns to the Main Loop entry point and the RCHARN subroutine is performed again.

When a new character is received by the microprocessor the character is inspected to see if it is a Start of Header (SOH) character. A SOH character is coded so that the intelligent transducer will recognize it as a command from the central computer or controlling unit 52. All valid commands from the controlling unit are coded to start with a SOH.

Figure 7:
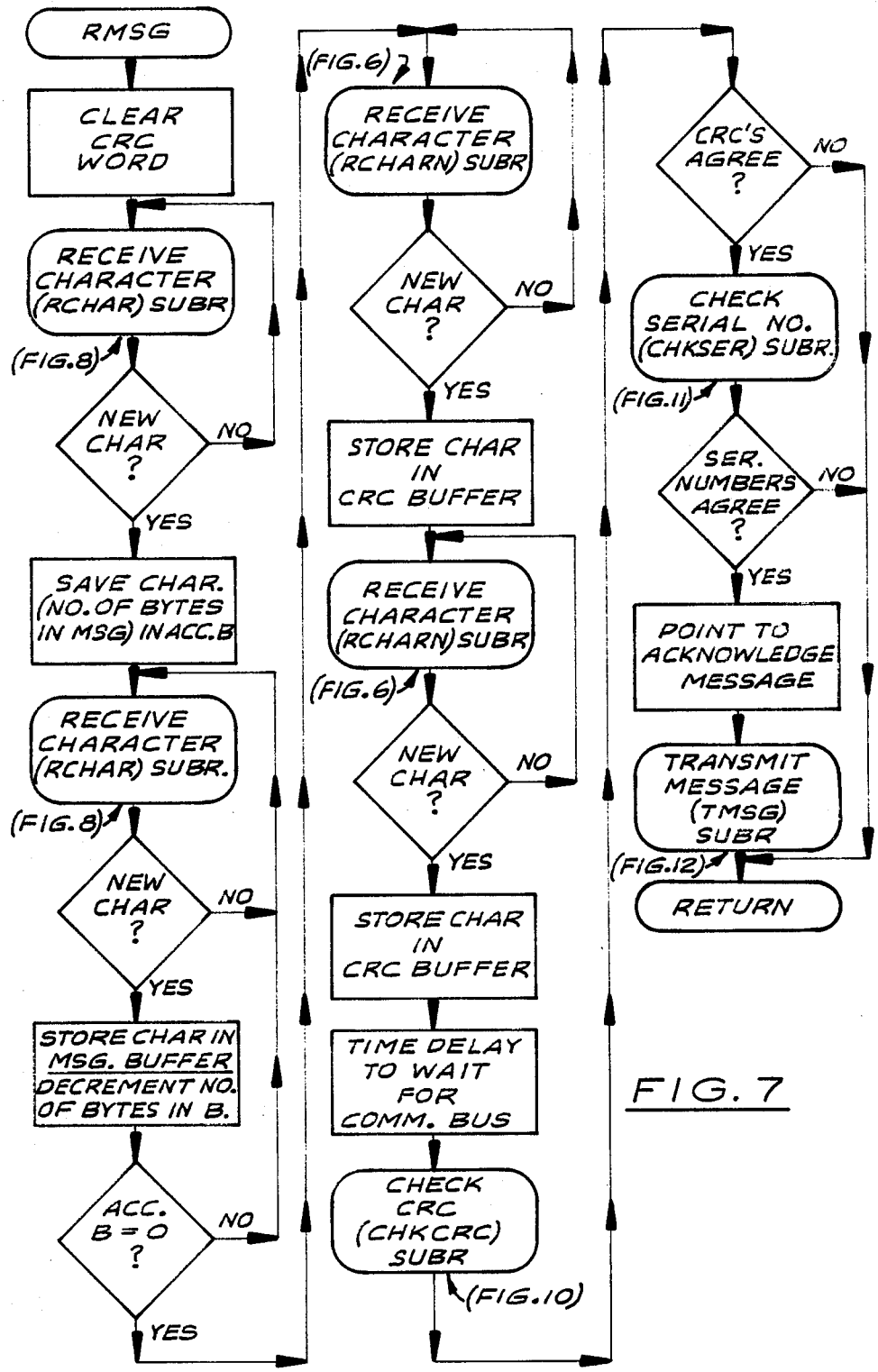
FIG. 7 is a simplified block diagram of the Receive Message (RMSG) subroutine.

If a new character is not recognized as a SOH, the program returns to the Main Loop entry point. If the new character is a SOH, a receive message (RMSG) subroutine is performed. The flow diagram for the RMSG subroutine is shown in FIG. 7. The RMSG subroutine receives the number of bytes designated in the message and checks if the Cyclic Redundancy Check (CRC) conforms to the data. The CRC is a number based on the message data and used to detect errors which is described in more detail below. If the CRC is incorrect, that is the particular value of the CRC does not conform to the data message, the program returns to the Main Loop entry point to await the receipt of a new character again. If the CRC is correct, it then checks to see if the serial number received with the data message matches the unique serial number stored in the microprocessor. As will be further explained below, each intelligent transducer module in the network is identified by a unique serial number stored in the microprocessor. The serial number is stored at the same time the instructions are programmed into the microprocessor; the serial number uniquely identifies each intelligent transducer from the other intelligent transducers and is used by the controlling unit to identify each intelligent transducer which is to be polled and to identify the intelligent transducer which broadcasts the data received by the controlling unit. Each command from the controlling unit contains in its message portion a serial number which corresponds to the particular intelligent transducer the command is intended for. Each message is inspected by the intelligent transducer to insure that the serial number in the message corresponds to the serial number of the intelligent transducer. If the serial number does not match the serial number stored within its memory, the program returns to the Main Loop entry point since the message or command received is directed to another intelligent transducer. If the serial number matches the serial number of the intelligent transducer, then the command is examined.

The intelligent transducer can be programmed to perform various operations. The number of operations is limited only by the size of the program memory in the microprocessor. The preferred embodiment described here contains three commands identified by the numbers 1 through 3. These commands are unique to this embodiment of the invention, although other commands would be similarly suitable. Other commands may be more appropriate for other embodiments; it has been found that for the vibrating wire strain gauge transducer, the commands described herein are quite suitable.

Figures 17, 18:
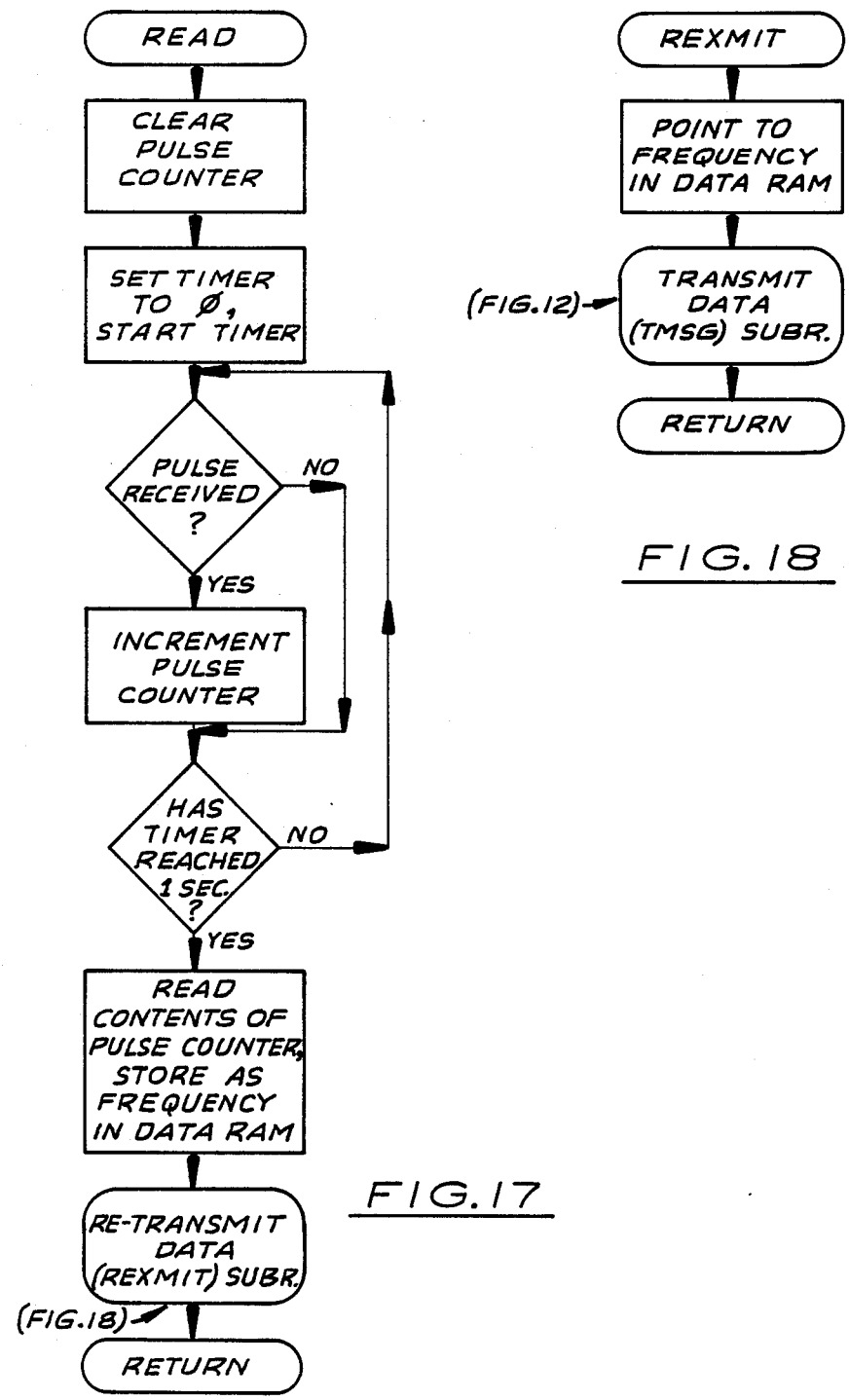
FIG. 17 is a simplified block diagram of the Take Reading (READ) command subroutine.
FIG. 18 is a simplified block diagram of the Retransmit Command (REXMIT) subroutine.

If the command "1" is received, then the program will initiate a take a reading (READ) subroutine. The flow diagram of the READ subroutine is shown in FIG. 17 and is described below. When the READ subroutine is complete, the program returns to the Main Loop entry point. If the command is not "1", then the message is compared to see if it contains a "2" command.

Figure 19:
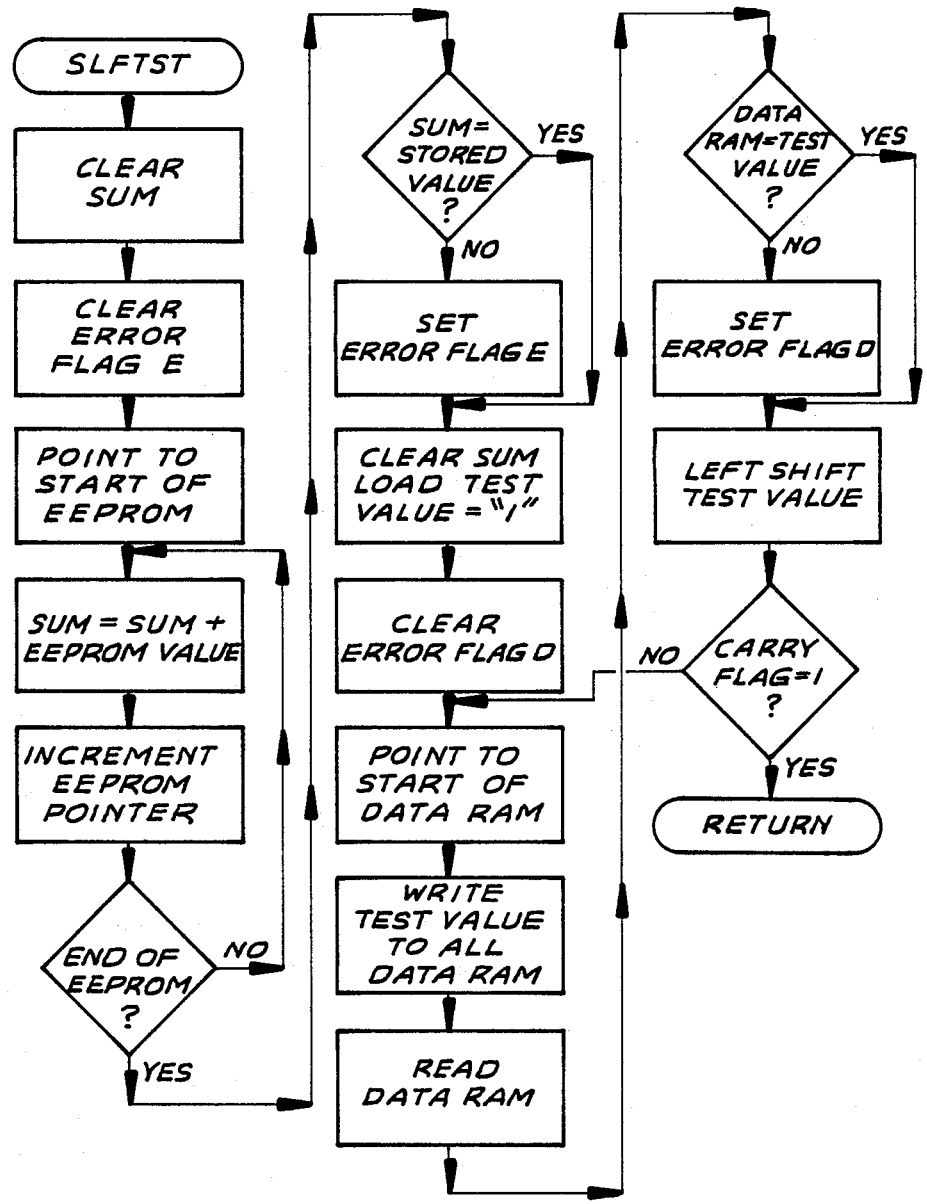
FIG. 19 is a simplified block diagram of the Self Test (SLFTST) subroutine.

If the command is "2", then the microprocessor will call the re-transmit (REXMIT) subroutine. The flow diagram for the REXMIT subroutine is shown in FIG. 18 and is described below. When the REXMIT subroutine is complete, the program returns to the Main Loop entry point. If the command is not "2", then the message is compared to see if it contains a "3" command. If the command is "3", then the microprocessor will go to the self test (SLFTST) subroutine. The flow diagram for the SLFTST subroutine is shown in FIG. 19 and is described below. When the SLFTST subroutine has been completed, the program returns to the Main Loop entry point. If the command is not "3", then the program returns to the Main Loop entry point.

2.3.2 Initialization Subroutine, INIT, FIG. 5

Figure 16:
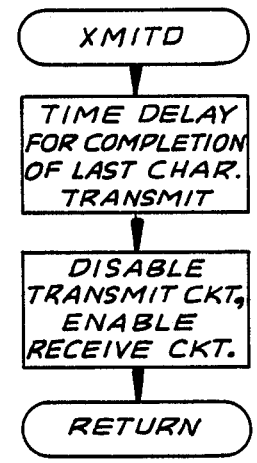
FIG. 16 is a simplified block diagram of the Transmit Circuit Disable (XMITD) subroutine.

Referring to the flow diagram for the Initialization (INIT subroutine, FIG. 5, the INIT subroutine begins by setting a timer prescalar or divide factor to 1, as is required for this application of the microprocessor. Then the program sets port C direction register for all outputs on port C. Port C can be set for either inputs or outputs; in this embodiment they are set for all outputs. The next step in the INIT subroutine is to set port D direction registers for outputs on bits 1, 3, 4 and 5, bit 0 being the lowest and bit 7 being the highest in an 8 bit register of 0 through 7. The program then enables the pulse accumulator to register the pulses generated by the detector circuit and inputted to port PAI of the microprocessor U1 at pin 27. Then the program sets the BAUD rate at 1200. This is the data serial transmission rate at which the serial data is received and transmitted to and from the microprocessor U1 to the data bus ports, as will be described below. The next step in the INIT subroutine is to enable the transmit and receive functions on the serial communications interface unit. Afterwards the transmit-disable (XMITD) subroutine is performed which sets the microprocessor into the receive mode and disables the transmit portions of the circuit. The flow diagram for the XMITD subroutine is shown in FIG. 16. After the XMITD subroutine is completed, the program proceeds to the Main Loop entry point.

2.3.3 Receive Character Subroutine (RCHARN) FIG. 6

Referring to the flow diagram for the receive character subroutine (RCHARN), FIG. 6, the RCHARN subroutine is the subroutine which checks to see if a new character has been received through the RXD input port and if so returns the new character. The RCHARN subroutine begins by clearing the carry flag which sets the carry flag to zero. If the subroutine returns with the carry flag set equal to one, it means that a new character was received; if the carry flag is not set or is cleared, that is equal to zero, it means that a new character has not been received. After the carry flag has been cleared, the serial communications data register is checked to see if a new character has been received through the serial port RxD (PD0) pin 20 of the microprocessor. If a new character has been received, then the character is loaded into a register and the carry flag is set to one. If a new character has not been received, the program returns with the carry flag still cleared.

2.3.4 Receive Message Subroutine (RMSG) FIG. 7

Figure 10:
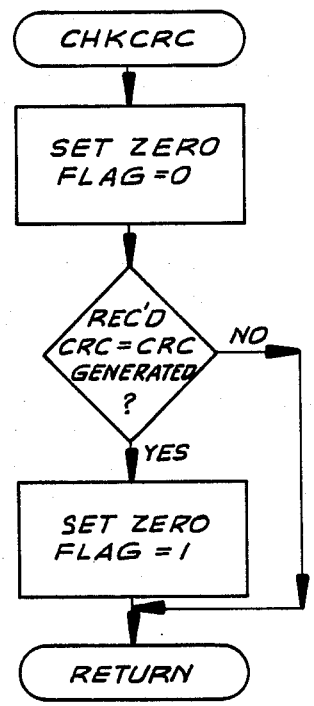
FIG. 10 is a simplified block diagram of the Check CRC (CHKCRC) subroutine.
Figure 11:
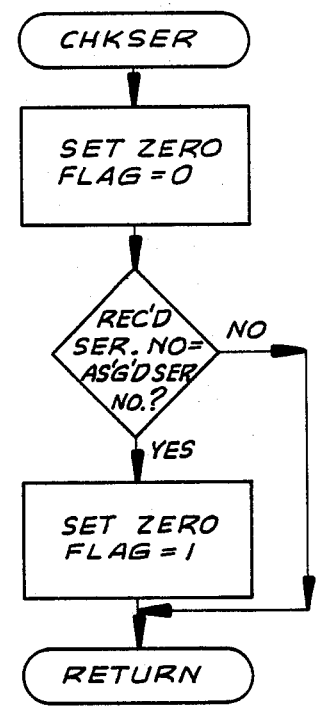
FIG. 11 is a simplified block diagram of the Check Serial Number (CHKSER) subroutine.

Referring to FIG. 7, there is described the flow diagram of the receive message RMSG subroutine. The RMSG subroutine begins by clearing the CRC word by setting it to zero. The program then performs the receive character (RCHAR) subroutine. The RCHAR flow diagram is shown in FIG. 8. The purpose of the RCHAR subroutine is to receive a character at the receive data port RxD (PD0), pin 20 of the microprocessor and to call the MAKECRC subroutine when a character has been received. This first character of the transmission described the number of bytes in the actual message and is stored in Accumulator B. Accumulator B is a temporary register in the microprocessor and is used to move data in memory and to perform arithmetic and logical operations on data. The program again calls the RCHAR subroutine. The RCHAR subroutine will be repeatedly called until a second character has been received at the RxD port (PD0), pin 20 of the microprocessor. The second character represents the first byte of the actual message portion of the transmission. When the second character is received, this second character is stored in a message buffer located in the U1 memory. The number stored in accumulator B determines the remaining number of bytes in the message to be received and each time a byte is received, the number stored in the accumulator B is decremented. If the contents of accumulator B is not found to be equal to zero, that is the end of the message has not been reached, then the program calls the receive character RCHAR subroutine, decrementing the contents of accumulator B by one each time a character of the message has been received and stored in the message buffer. Eventually the contents of accumulator B will reach zero. At this time the program will interpret the following portion of the receive data message as a CRC code comprised of two characters. These two characters are received serially using the receive character RCHARN subroutine, FIG. 6, and stored in the CRC buffer. After the CRC has been stored, the program waits for a delay time in order for the interface adapter to become ready to receive data. The time delay in the preferred embodiment is 0.8 seconds. After the time delay, a check CRC (CHKCRC) subroutine is performed. The CHKCRC flow diagram is shown in FIG. 10. The purpose of the CHKCRC subroutine is to determine if the CRC word received is correct. Each time a message is received, the microprocessor creates its own CRC word. The microprocessor's created CRC word is then compared with the CRC word received with the message to verify if they are identical; if the two CRC words are not identical the program will return to the Main Loop entry point described in FIG. 4 without using the data stored in the message buffer. If the microprocessor's created CRC agrees with the receive message CRC, then the check serial number (CHKSER) subroutine is performed. The CHKSER subroutine is shown in FIG. 11.

As explained above, the purpose of the CHKSER subroutine is to compare the serial number received in the message from the controller with the serial number programmed into the microprocessor's memory. If the serial number received from the controller does not agree with the serial number in the microprocessor's memory, then the program returns to the Main Loop entry point as described in FIG. 4. If they do agree, then the microprocessor points to an acknowledge message which is transmitted to the controller as a hand-shake acknowledgment to the controlling unit confirming that a message containing a correct CRC and serial number has been received by the intelligent transducer. The program then performs a transmit message (TMSG) subroutine before the program returns to the Main Loop entry point as described in FIG. 4. The flow diagram of the TMSG subroutine is shown in in FIG. 12.

2.3.5 Receive Character With CRC Subroutine (RCHAR) FIG. 8

Referring to FIG. 8, there is described a receive character with CRC (RCHAR) subroutine flow diagram. As indicated, the first step of this subroutine is to call the receive character with no CRC subroutine RCHARN, described in flow diagram FIG. 6 which receives a character. When a new character has been received, the make CRC (MAKECRC) subroutine is performed. The flow diagram of the MAKECRC subroutine is shown in FIG. 9. Once the MAKECRC subroutine has been performed, a carry flag is set which indicates that a new character has been received. After the carry flag has been set, the program returns to the calling subroutine.

2.3.6 Make CRC Subroutine (MAKECRC) FIG. 9

The flow diagram of the MAKECRC subroutine is described in FIG. 9. The MAKECRC subroutine begins by saving A, B and X registers in order to restore these values after the MAKECRC subroutine has been performed. The program points to the current CRC word and loads the loop counter to the value eight. The CRC word is comprised of two bytes, each eight bits long. The loop counter keeps track of the number of times the CRC word is rotated as is described below. In keeping with well known practice, the current CRC word is updated after each bit, so that only the remainder is retained, and the following steps are used to successively compute the CRC for each bit of the character: (1) exclusive-OR character register and least significant byte of current CRC word; (2) if least significant bit of result equals 1, exclusive-OR 4002 Hex and current CRC word, overwriting current CRC word; (3) perform right circular bit rotation on current CRC word, overwriting current CRC word; (4) perform logical right shift of character register by one bit location. The program loops through the above described steps until the loop counter is decremented to zero or eight times. At this time the A, B and X registers are restored to their original values and the program returns to set a carry flag as described in the receive character RCHAR subroutine, FIG. 8.

While we have described in this preferred embodiment a particular subroutine which creates a CRC word, it is obvious that any of the other ways to create CRC words or other error check codes which are well-known in the art can be used with equal success.

2.3.7 Check CRC Subroutine (CHKCRC) FIG. 10

The check CRC (CHKCRC) subroutine flow diagram is described in FIG. 10. The CHKCRC subroutine begins by clearing the zero flag to zero. The zero flag is similar to the carry flag used in other subroutines; it is a flag which is set or cleared depending upon the conditions and does not change when the program is returned from one subroutine to the calling subroutine, but records the results of the particular subroutine or operation. The program then compares the received CRC word with the CRC word generated by the MAKECRC subroutine. If the CRC words are not identical, the program returns to the calling subroutine and the zero flag remains set to zero. If the two CRC words are identical, the program then sets the zero flag to a one before the program returns to a calling subroutine.

2.3.8 Check Serial Number Subroutine (CHKSER) FIG. 11

The check serial number (CHKSER) subroutine flow diagram is described in FIG. 11. The CHKSER subroutine begins by setting the zero flag to zero and then compares the received serial number to the original serial number stored within the microprocessor. The assigned serial number is a uniquely coded word of 2 bytes of 8 bits programmed into the EEPROM and is used to uniquely identify the intelligent transducer. The serial number code is contained in each command sent by the controller along the common data bus. Since all of the intelligent transducers will receive the same commands, each intelligent transducer will inspect the serial number portion of the command to determine whether the command is directed to itself or some other intelligent transducer. If the received serial number is not identical to the assigned serial number, then the program returns to the calling subroutine while the zero flag remains set to zero. If the received serial number is identical to the assigned serial number, the program then sets the zero flag to a one before returning to the calling subroutine. This enables the calling subroutine to continue on towards interpreting or carrying out the received commands.

Figure 12:
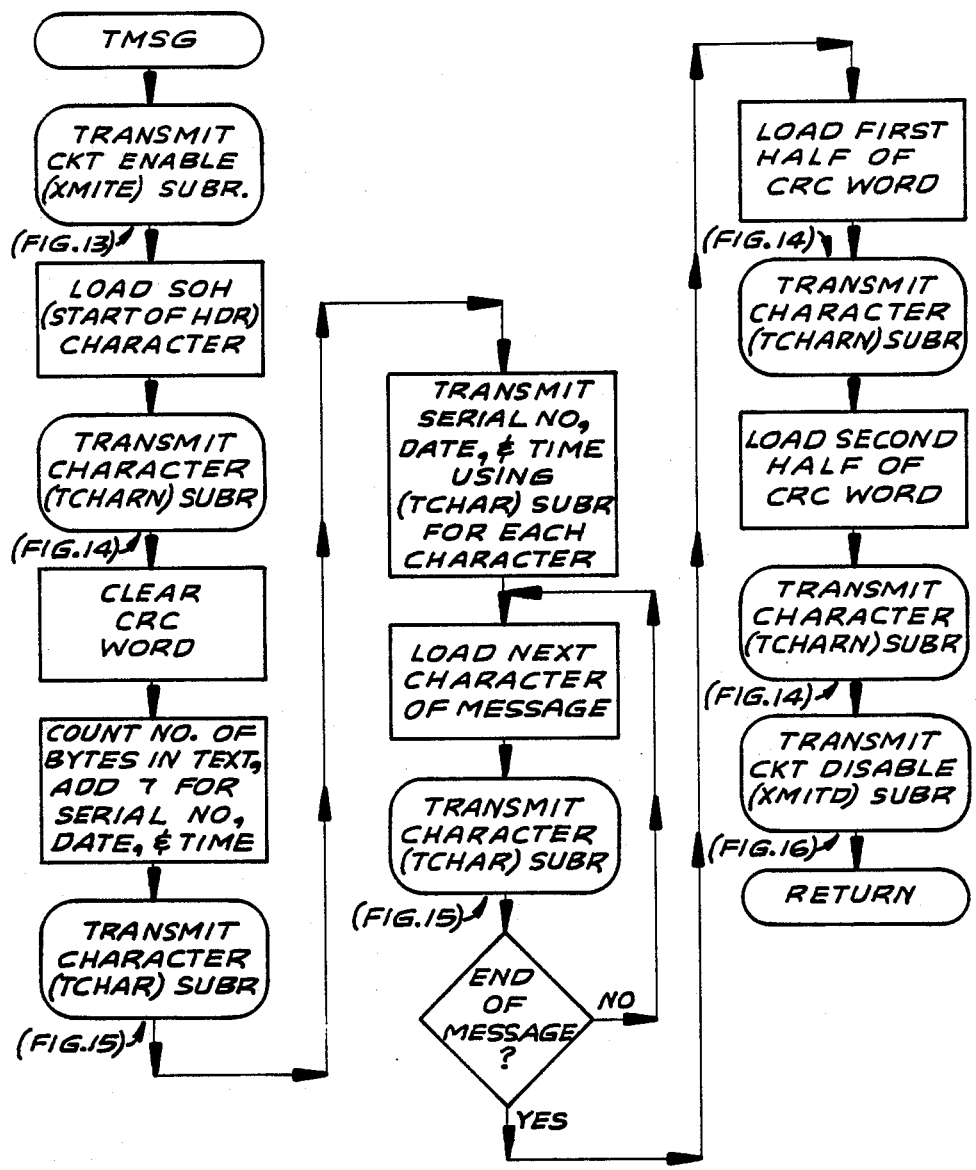
FIG. 12 is a simplified block diagram of the Transmit Message (TMSG) subroutine.

2.3.9 Transmit Message Subroutine (TMSG) FIG. 12

Figure 14:
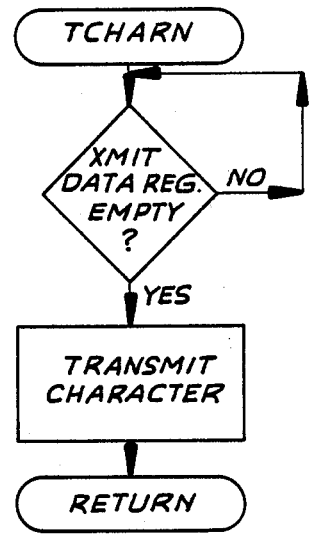
FIG. 14 is a simplified block diagram of the Transmit Character (TCHARN) subroutine.
Figure 15:
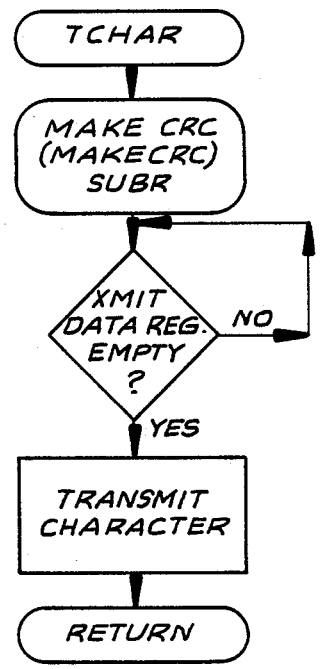
FIG. 15 is a simplified block diagram of the Transmit Character with CRC (TCHAR) subroutine.

The transmit message (TMSG) subroutine flow diagram is described in FIG. 12. The TMSG subroutine begins by performing the transmit circuit enable (XMITE) subroutine. The flow diagram of the XMITE subroutine is described in FIG. 13. The XMITE subroutine enables the transmit portion of the Transmit/Receive buffer hardware to send data from the TxD transmit port of the microprocessor, pin 21. The TMSG subroutine then loads the Start of Header character (SOH). Each character of the message will then be transmitted serially. This is performed after the SOH character has been loaded by performing the transmit character (TCHARN) subroutine. The TCHARN subroutine flow diagram is shown in FIG. 14 and is one of the two transmit character subroutines described in this preferred embodiment. The other transmit character subroutine TCHAR calls from within its subroutine the MAKECRC subroutine while the TCHARN subroutine does not. The TCHAR subroutine is shown in FIG. 15 and the MAKECRC subroutine is shown in FIG. 9.

After the TCHARN subroutine is performed, the CRC word is cleared by setting both bytes of eight bits to zero. The program then calculates a length of text number by counting the number of bytes in the text to determine the length of the message and adds seven to account for the two characters comprising the intelligent transducer's serial number and the five characters comprising date and time. The date and time information is received in the command message from the controller, and it is echoed back to the controller as part of the data message. This length of text number is transmitted using the transmit character with CRC (TCHAR) subroutine. The flow diagram for the TCHAR subroutine is described in FIG. 15. After the length of text number has been transmitted, the next character corresponding to the first byte of the serial number is loaded in the transmit register to be transmitted using the TCHAR subroutine. The next byte of the serial number is loaded and transmitted using the TCHAR subroutine. The next segment of the message will be five characters representing the date and time, followed by the data, which will all be serially transmitted using the TCHAR subroutine. At the end of each transmission of a character, a check of the message is made to determine whether or not there are any characters in the data portion of this message remaining to be transmitted. If there are characters remaining to be transmitted, the TCHAR subroutine will be performed until the end of message has been sent. Next the first byte of the CRC word is loaded and transmitted using the transmit character (TCHARN) subroutine. The flow diagram of the TCHARN subroutine is shown in FIG. 14. After the TCHARN subroutine has been performed, the program then loads the second byte of the CRC word into the transmit data register and it is transmitted by performing a TCHARN subroutine. The TMSG subroutine is completed by performing a transmit circuit disable (XMITD) subroutine before returning to the calling subroutine. A flow diagram of the XMITD subroutine is shown in FIG. 16. The object of the XMITD subroutine is to disable the transmit circuitry between the microprocessor and the transmitting bus ports A and B, as will be later described.

Figure 13:
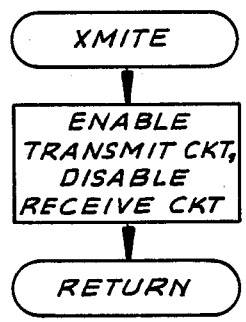
FIG. 13 is a simplified block diagram of the Transmit Circuit Enable (XMITE) subroutine.

2.3.10 Transmit Circuit Enable Subroutine (XMITE) FIG. 13

The transmit enable (XMITE) subroutine flow diagram is shown in FIG. 13. The XMITE subroutine enables the transmit circuit and disables the receive circuit which interface the microprocessor and the data communications bus ports. Referring to the schematic of the intelligent transducer, FIG. 3, the transmission mode is enabled by impressing a low voltage to the transmission enable port PD3, TE at pin 23 of the microprocessor U1. This causes the control element in the inverting buffer U3B to enable the four inverting buffers in U3B to operate.

2.3.11 Transmit Character Subroutine (TCHARN) FIG. 14

The transmit character (TCHARN) subroutine flow diagram is described in FIG. 14. The TCHARN subroutine begins by inspecting the transmit data register on the microprocessor. If the transmit data register contains information, that is the register is not empty, the program returns to the inspection mode. When the microprocessor has completed transmission of the previous character and the transmit data register is empty the program will transmit the character and then return to the calling subroutine. Transmission occurs by impressing a series of data pulses corresponding to the bits comprising each character on to the TxD data port, pin 21 of the microprocessor. The pulses are transmitted to the inverting buffer module U3B to be communicated to ports A and B of the transmission bus, and to be received by the controller 52.

2.3.12 Transmit Message With CRC Subroutine (TCHAR) FIG. 15

The other character transmit subroutine, the transmit character with CRC (TCHAR) subroutine flow diagram is shown in FIG. 15. The TCHAR subroutine begins by performing the MAKECRC subroutine described in FIG. 9, and then inspects the microprocessor's transmit data registers. If the transmit data register contains information, that is the register is not empty, the program returns to the inspection mode. When the transmit data transfer is empty, the program transmits the character and then returns to the calling subroutine. Transmission occurs by impressing a series of data pulses corresponding to the bits comprising each character on to the TxD data port, pin 21 of the microprocessor U1 as described above.

2.3.13 Transmit Circuit Disable Subroutine (XMITD) FIG. 16

The transmit circuit disable (XMITD) subroutine flow diagram is shown in FIG. 16. The XMITD subroutine begins by awaiting a time delay to allow for the completion of any transmission which may be occurring. This is required because the transmission of a character takes a finite amount of time to be serially transmitted from the microprocessor, at the Baud rate of 1200. The time delay in this preferred embodiment is 0.48 seconds. After the time delay, the transmit circuit is disabled and the receive circuit is enabled. This is accomplished by setting +5 volts on the Transmit Enable, TE, PD3 port, pin 23 of the microprocessor U1. The +5 volts disables the four inverting buffers in U3B and interrupts the inverted signal output from the inverting buffer module at pin 9, controlling the positive input of the comparator U5D, pin 12. Thereafter the program returns to the calling subroutine.

2.4 Intelligent Transducer Commands

As discussed above, the presently described embodiment has three commands labeled one through three which are unique to this embodiment.

2.4.1 Take a reading "1" Command (READ) FIG. 17

The flow diagram for the "1", or READ command is shown in FIG. 17. The object of the READ subroutine is to convert the pulse data received by the accumulator port of the microprossesor, PAI at pin 27 into a numerical representation of the pulse frequency. As described above, the system calculates changes of strain in the vibrating wire strain gauge assembly which is mathematically related to the change in frequency of the vibrating wire. The pulses increment an internal count accumulator, and the number of pulses counted in one second is the frequency. To begin the READ subroutine, the pulse counter and the one-second timer are both cleared to zero. The PAI input at pin 27 is checked, and if a pulse has been sensed, the pulse counter is incremented. Next the one-second timer is checked to see if the time is up, and if not the PAI input is again checked. This loop is repeated until one second has passed, and then the contents of the pulse counter is read and stored in the data RAM as the frequency. Next the frequency is transmitted to the controller by calling the REXMIT subroutine. The flow diagram of the REXMIT subroutine is shown in FIG. 18. Once the reading has been taken and transmitted, the program returns to the calling subroutine.

2.4.2 RETRANSMIT command (REXMIT) FIG. 18

The flow diagram for the retransmit (REXMIT) subroutine, or "2" command is shown in FIG. 18. If the intelligent transducer has not received a "1" command and a "2" command has been received, then the program will begin the REXMIT subroutine. The purpose of this routine is to retransmit the data transmitted in the previous message. The controller may send this command if it did not receive the previous transmission without errors. This subroutine starts by pointing to the data in data RAM, the transmits the data by calling the Transmit Message (TMSG) subroutine described in FIG. 12. Once this has been completed, the program returns to the caling subroutine.

2.4.3 Self-Test "3" Command (SLFTST) FIG. 19

The flow diagram for the self-test (SLFTST) subroutine or "3" command is shown in FIG. 19. If the intelligent transducer has not received a "1" or "2" and has received a "3" command, then the program will perform the SLFTST subroutine. The purpose of the SLFTST subroutine is to require the microprocessor to perform diagnostic tests upon the stored instructions contained in EEPROM, and upon the RAM locations.

When the intelligent transducer is originally programmed with its set of instructions, an expected value code dependent upon the sum of the values of each byte of the instructions is also programmed and stored. This expected value code is calculated by sequentially pointing to each character of the instructions and summing the bytes. Therefore, one of the objects of the SLFTST is to repeat this process on the instructions stored in the intelligent transducer and compare the results with the stored expected value code.

The program begins by clearing a SUM variable in the RAM by setting it to zero, then clearing an E flag variable by setting that to zero and then pointing to the start of the EEPROM. This, as described above, is the portion of memory which contains the instructions. The program then calculates the sum of the variable SUM and the value of the current byte of EEPROM, storing the result in SUM. The prom increments the current value of the EEPROM pointer by one and checks to see if it is at the end of the EEPROM. If not, the program will jump back to set the SUM equal to the current value of SUM plus the current value of EEPROM, increment the EEPROM pointer and continue to loop until it finds itself at the end of the EEPROM. This operation creates a SUM value dependent upon the values obtained from the EEPROM. The program then compares the SUM value obtained with the stored value which is a known quantity previously stored in memory as explained above. If the values are not the same, the program sets an error flag E. This flag indicates if one or more of the values of the EEPROM is different from the expected value. If the derived value of SUM is identical to the expected value, the program clears the error flag E and then clears the SUM register and loads a TEST register with the value of 1. The program then clears the error flag D and points to the start of the RAM. The program then writes the test value, initially set to one, to all the RAM locations. The RAM values are then read to compare the TEST value with the value read from the RAMs. If the values are not the same, then the program sets the error flag D equal to the value of one which indicates a malfunction in the RAM location of the microprocessor. If the value read from the RAM is the same as the stored TEST value, then the program performs a left-shift of the TEST value. The program will write the test value to all the RAM locations sequentially, shifting through each of the possible eight values until the test bit of 1 is shifted into the carry flag. If, at any point in the cycle the current value of the RAMs read, after the test value has been written into the RAMs, is not identical to the current TEST value, the error flag D will be set to one indicating malfunction in that particular RAM location. The program returns to the calling subroutine when the program finds a carry flag equal to one after completing the eight left-shifts of the TEST value.

2.5 Intelligent Transducer Boot Program Overview

The various decisions, branches, and subroutines used to transfer the normal intelligent transducer operating program to the EEPROM of the intelligent transducer are as follows: In order for the intelligent transducer module to operate, it must have a 'program' residing in its EEPROM (Electrically Erasable Programable Read-Only Memory). The EEPROM is semi-permanent; that is, the code or data in the EEPROM is retained indefinitely even though its power supply is removed. In order to change the code in the EEPROM, a special procedure must be followed, as described below.

The intelligent transducer module is designed to have its microprocessor operate in the mode designated by the manufacturer as the 'Special Bootstrap' mode. When the microprocessor is powered up in the 'Special Bootstrap' mode, it waits for a character (or a byte composed of 8 bits) to be received at its RXD serial input port (PD0, pin 20 of U1). Additionally, it transmits a bit pattern of all 0's from its TXD serial output port (PD1, pin 21 of U1) until a character has been received at the RXD input.

If the first character received at the RXD input is all 0's, microprocessor control is transferred to the first byte of the EEPROM. If the first character is all 1's, the microprocessor waits to receive a 256-byte block of code which it stores in its Ramdom Access Memory (RAM), then transfers control to the first byte of RAM.

When the intelligent transducer module is first powered up for normal operation, the PD4 Input/Output pin of the microprocessor (pin 24 of U1) is initialized as an input. The pull-down resistor R106 holds the voltage on the PD4 pin (the PGM node) at 0 volts to enable buffer circuitry U3A. This allows signals transmitted from the TXD output of the microprocessor to be received by the RXD input of the microprocessor. The bit pattern of all 0's from the TXD output is therefore received by the RXD input, and the microprocessor interprets this as a signal to begin its program by reading its first instruction from the first location of the EEPROM.

However, in order to transfer a program to the EEPROM, the microprocessor must be powered up in the 'Special Bootstrap' mode and receive an initial character of all 1's through its RXD input. This is accomplished by holding the PGM node at a high voltage (+5 volts) when the intelligent transducer module is powered up, thereby disabling the buffer between TXD and RXD and preventing the bit pattern of all 0's from being received at RXD. Instead, a character composed of all 1's is sent to the intelligent transducer module on the communication bus, at port A and port B, and this is received at the RXD input. The crystal frequency of the intelligent transducer module dictates that the serial data transfer clock rate be at 1200 BPS.

Holding the PGM node high is done by having a jumper connected between the PGM node (pin 15 of the U3 device) and the +5 volt power connection of the intelligent transducer module as power is applied to the module. Now, the microprocessor waits for exactly 256 bytes of code to be received through its RXD input, and these bytes are stored in the microprocessor's RAM. Then, the next instruction which the microprocessor executes is read from the first location of the RAM.

The intelligent transducer program is transferred to the EEPROM by first sending a temporary 256-byte BOOT program to be stored in the RAM, then sending the 512 bytes of the intelligent transducer program. This BOOT program follows a procedure as specified by the microprocessor manufacturer which erases the current contents of the EEPROM and then writes 512 bytes of code to it. The BOOT program is designed to allow the microprocessor to receive the 512 bytes of code through its RXD input, and this 512-byte block of code is comprised of the intelligent transducer program.

Once this procedure has been completed, power is removed from the intelligent transducer module, and the jumper between +5 and the PGM node is removed. This procedure would normally be performed just once, at the time of manufacture of the intelligent transducer. Reprogramming of the intelligent transducer modules can be accomplished at any time by the foregoing series of steps.

INDUSTRIAL APPLICABILITY

A system described herein is used for detecting the movement of various physical structures. For example, strain-gauge transducers are placed at various locations for a physical structure such as a bridge, building, dam, excavation, etc. The input/output ports from the intelligent transducers are connected together along a common cable and through an adaptor to the serial in/out port of the computer. The computer is remotely located at a convenient place where the system is monitored. Each intelligent transducer is programmed with its uniqe address code and operating functions to convert and store the transducer's output in a digital format upon receipt of a first polling command, to calculate a cyclic redundancy check (CRC) based upon the digital response and to transmit the digital response and CRC upon receipt of a second polling command. A computer means is programmed to routinely poll the various transducer sites according to the needs of the monitoring system and standard practice, and to reject data according to an incorrect CRC. The computer means can also be programmed to trigger an alarm means should any of the data exceed preset values as may be prescribed by the operator. The computer can also be programmed to interrupt the regular measurement program in order to make specific polling requests according to the operator's needs.

This system can be used advantageously for large structures such as pipe lines, dams, airports and buildings where the present economics of cabling systems make large structural movement detector systems impractical or economically unfeasible.

In compliance with the statute, the invention has been described in language more or less specific as to structural and functional features. It is to be understood, however, that the invention is not limited to the specific features shown, since the means and construction herein disclosed comprise but a preferred form of putting the invention into effect. The invention is, therefore, claimed in any of its forms or modifications within the legitimate and valid scope of the appended claims, appropriately interpreted in accordance with the doctrine of equivalents.

I claim:

1. A digitally based monitoring system having, in locations remote from a controller means, a plurality of intelligent transducer modules for measuring and transmitting digital information on physical phenomena, the system comprising:
   a controller means (1) to produce digital polling signals, said polling signals each having a unique address portion and an instruction portion to cause said intelligent transducer modules to perform programmed functions when said unique address portion of said polling signal is identical to said intelligent transducer module's own unique address, and (2) to receive, record, and display digital responses from said intelligent transducer modules in an organized manner;
   a plurality of intelligent transducer modules, each said module including transducer means, microprocessor means, and buffer circuitry means proximate to one another, wherein said transducer means generates signals corresponding to physical measurements of a particular physical phenomena, said microprocessor means includes memory means programmed to (1) receive a uniquely addressed digital polling signal and instruction from a remote controller means, (2) activate said transducer means to generate said signal, (3) translate said signal into a digital response, and (4) transmit said digital response to said controller means, and said buffer circuitry means directs incoming and outgoing data between said microprocessor means and said controller means;
   power source means to power said intelligent transducer modules; and
   means to conduct said polling signals and said digital responses between each of said intelligent transducer modules and said controller means, said means to conduct having a portion common to all of said intelligent transducer modules in said monitoring system.

2. The monitoring system of claim 1 wherein said microprocessor means and said memory means are further programmed to store said digital response temporarily and to transmit said digital response to said controller means only upon receiving a further uniquely addressed digital polling signal and instruction from said controller means.

3. The monitoring system as described in claim 1 wherein said intelligent transducer modules generate and transmit a redundant error code corresponding to said digital response, and said controller means receives said redundant error code, computes a redundant error code from said digital response received, compares the received redundant error code to the computed redundant error code, and rejects said digital response whenever the received redundant error code is not equivalent to the computed redundant error code.

4. The monitoring system as described in claim 3 wherein said controller means generates and transmits a redundant error code corresponding to said digital polling signal, and said intelligent transducer modules receive said redundant error code, compute a redundant error code from said digital polling signal received, compare the received redundant error code to the computed redundant error code and reject said digital polling signal whenever the received redundant error code is not equivalent to the computed redundant error code.

5. The monitoring system as described in claim 4 wherein said digital polling signals, said digital responses, and said redundant error code signals are transmitted and received serially from input/output serial transmission ports.

6. The monitoring system as described in claim 5 wherein said means to conduct comprises (1) an insulated conductor for transmission of said polling signals, digital responses and redundant error code signals, and (2) an insulated conductor to connect said power source means with said intelligent transducer modules, and (3) a ground reference conductor for said polling signals, digital responses, redundant error code signals and for ground return to said power source means.

7. The monitoring system as described in claim 5 wherein said means to conduct comprises (1) an insulated conductor for transmission of said polling signals, digital responses, redundant error code signals and power source means and (2) a ground reference conductor for said polling signals, digital responses, redundant error codes signals and for ground return for said power source means.

8. The monitoring system as described in claim 5 wherein said means to conduct comprises (1) two insulated conductors for transmission of said polling signals, digital responses, and redundant error code signals to said intelligent transducer modules and to said controller means, (2) an insulated conductor connecting said power source means with said intelligent transducer modules, and (3) a ground reference conductor for said polling signals, digital responses, response redundant error code signals and power return to said power source means.

9. The monitoring system as described in claim 5 wherein said means to conduct comprises a balanced pair of insulated conductors for transmitting said polling signals, digital responses, and redundant error code signals in a mirrored fashion, and a pair of insulated conductors to connect power supply means with said intelligent transducer modules.

10. The monitoring system as described in claim 5 wherein said means to conduct comprises a pair of insulated conductors for transmitting said polling signals, digital responses, and redundant error code signals superimposed on a relatively constant voltage, said voltage supplying power to said intelligent transducer modules.

11. A structural monitoring system having a plurality of intelligent transducer modules attached to a structure in locations remote from a controller means, said modules adapted for measuring and transmitting digital information on physical phenomena occurring at said remote attachment sites of said intelligent transducer modules, the system comprising:
   a controller means (1) to produce digital polling signals, said polling signals each having a unique address portion and an instruction portion to cause said intelligent transducer modules to perform programmed functions when said unique address portion of said polling signal is identical to said intelligent transducer module's own unique address, and (2) to receive, record, and display digital responses from said intelligent transducer modules in an organized manner;

a plurality of intelligent transducer modules, each said module including transducer means, microprocessor means, and buffer circuitry means proximate to one another, wherein said transducer means generates signals corresponding to physical measurements of a particular physical phenomenon, said microprocessor means includes memory means programmed to (1) receive a uniquely addressed digital polling signal and instruction from a remote controller means, (2) activate said transducer means to generate said signal, (3) translate said signal into a digital response in compact binary form, and (4) transmit said digital response to said controller means, and said buffer circuitry means directs incoming and outgoing data between said microprocessor means and said controller means;

power source means to power said intelligent transducer modules; and data bus means to conduct said polling signals and said digital responses between each of said intelligent transducer modules and said controller means.

12. The structural monitoring system of claim 11 wherein said transducer means is a vibratory wire strain gauge.

13. The structural monitoring system of claim 11 wherein said microprocessor means and said memory means are further programmed to store said digital response temporarily and to transmit said digital response to said controller means only upon receiving a further uniquely addressed digital polling signal and instruction from said controller means.

14. A structural monitoring system as described in claim 11 further comprising:

a plurality of input/output serial interfaces, each interface having a data port enabling said intelligent transducer modules and controller means to transmit and receive said polling signals and digital responses serially.

15. A structural monitoring system as described in claim 14 wherein said data bus means comprises a pair of conductors, a first conductor connected with a first set of data ports of said plurality of input/output serial interfaces, and a second conductor connected with a second set of data ports of said plurality of in/out serial interfaces, said second conductor carrying an inverted signal referenced to said first conductor.

16. A structural monitoring system as described in claim 11, wherein said memory means within said intelligent transducer modules further contains program instructions to generate a redundant error code corresponding to numerical values of said digital response to be transmitted, where said redundant error code is transmitted as part of said digital response, and wherein said controller means further comprises a means (1) to compare said redundant error code transmitted as part of said digital response to a redundant error code computed using said numerical values of said digital response and (2) to reject any digital response which does not have a received redundant error code corresponding to said computed redundant error code.

17. The structural monitoring system as described in claim 16 wherein said controller means further contains instructions to generate a redundant error code corresponding to numerical values of said polling signals to be transmitted, where said redundant error code is transmitted as part of said polling signal, and wherein said intelligent transducer modules further contain in said memory means instructions to compare said transmitted redundant error code to a redundant error code computed using numerical values of said polling signal and to reject any polling signal which does not have a received redundant error code corresponding to said computed redundant error code.

18. A structural monitoring system as described in claim 17 wherein said data bus means to conduct comprises a balanced pair of conductors for transmitting said polling signals, digital responses, and redundant error code signals in a mirrored fashion, and a pair of insulated conductors to connect power supply means with said intelligent transducer modules.

19. The structural monitoring system as described in claim 17 wherein said data bus means to conduct comprises a pair of conductors for transmitting said polling signals, digital responses, and redundant error code signals superimposed on a relatively constant voltage, said voltage supplying power to said intelligent transducer modules.

20. A method of monitoring physical phenomena at remote locations over a common communication path comprising the steps of:

programming a plurality of remote intelligent transducer modules with instructions to gather and transmit, when polled, information from a sensor means to a controller means in a digital response in compact binary form, each of said modules including transducer mean, microprocessor means, and buffer circuitry means proximate to each other, and each of said modules having a unique address;

generating and transmitting a digital polling signal from said controller means to said plurality of remote intelligent transducer modules, said digital polling signal having a unique address portion and an instruction portion;

the one intelligent transducer module having a unique address equivalent to said unique address portion of said digital polling signal then responding by translating to a digital response a signal from said sensor means, which said signal corresponds to a measurement of one of said physical phenomena, and transmitting said digital response in compact binary form to said controller means;

repeating said step of generating and transmitting a polling signal addressed to each of said remote intelligent transducer modules whereby information gathered by each of said intelligent transducer modules is transmitted to said controller means for the purpose of monitoring, displaying and storing said information.

21. The method of claim 20 wherein each intelligent transducer module prepares and transmits a pair of simultaneous digital responses on two conductors, said digital responses mirroring each other to cancel out extraneous noise.

22. The method of claim 20 wherein said step of responding by translating to a digital response a signal from said sensor means further includes the steps of storing said digital response in a memory means included in said intelligent transducer module and transmitting said digital response to said controller means upon receipt of another polling signal having the unique address of said intelligent transducer module.

23. The method of claim 20 wherein said intelligent transducer modules generate and transmit redundant error codes corresponding to said digital responses, and wherein said controller means computes a redundant error code from each of said digital response, compares said transmitted redundant error code to said computed redundant error code and rejects any digital response whenever said transmitted redundant error code is not equivalent to said computed redundant error code.

24. The method of claim 23 wherein said controller means generates and transmits a redundant error code corresponding to said polling signal, and wherein each said intelligent transducer module computes a redundant error code from said polling signal, compares said transmitted redundant error code to said computed redundant error code, and rejects polling signal whenever said transmitted redundant error code is not equivalent to said computed error code.

25. An intelligent transducer module, said module including transducer means, microprocessor means, and buffer circuitry means proximate to one another, said module comprising:

transducer means suitable for measuring a physical phenomenon and generating a signal corresponding to a measurement of said phenomenon;

proximate to said transducer means, a microprocessor means including memory means and programmed to (1) receive a uniquely addressed digital polling signal and instruction from a remote controller means, (2) activate said transducer means to generate said signal, (3) translate said signal into a digital response and store said digital response temporarily, and (4) transmit said digital response to said controller means upon instruction; and integral to said microprocessor means, a buffer circuitry means to direct incoming and outgoing data between said microprocessor means and said controller means.

* * * * *